(12) United States Patent
Fukagawa

(10) Patent No.: US 6,502,889 B2
(45) Date of Patent: Jan. 7, 2003

(54) BODY COVER DEVICE FOR CAR

(76) Inventor: Yoshiharu Fukagawa, c/o La Parole Co., Ltd., 9-11, Hikarimachi 1-chome, Higashi-ku, Hiroshima-shi, Hiroshima (JP), 732-0052

( * ) Notice: Subject to any disclaimer, the term of this patent is extended or adjusted under 35 U.S.C. 154(b) by 0 days.

(21) Appl. No.: 10/040,706

(22) Filed: Jan. 7, 2002

(65) Prior Publication Data

US 2002/0084671 A1 Jul. 4, 2002

Related U.S. Application Data

(63) Continuation-in-part of application No. 09/719,966, filed on Dec. 18, 2000.

(30) Foreign Application Priority Data

Apr. 16, 1999 (JP) ............................................ 11-109504

(51) Int. Cl.⁷ ................................................ B60J 11/00
(52) U.S. Cl. ............................ 296/98; 296/136; 160/24
(58) Field of Search .......................... 296/98, 117, 136, 296/107.17, 95.1, 124; 135/115, 87, 119; 160/263, 310, 326, 370.22, 26, 24; 150/166

(56) References Cited

U.S. PATENT DOCUMENTS

| | | | | |
|---|---|---|---|---|
| 1,461,478 A | * | 7/1923 | Daniels ..................... 296/95.1 |
| 1,912,231 A | * | 5/1933 | Wandscheer ................. 296/98 |
| 1,918,423 A | * | 7/1933 | Persinger ................... 135/115 |
| 2,213,601 A | * | 9/1940 | White ......................... 296/98 |
| 2,688,513 A | * | 9/1954 | Poirier ........................ 296/98 |
| 3,021,894 A | * | 2/1962 | La Due ....................... 296/98 |
| 3,222,102 A | * | 12/1965 | Lucas ......................... 296/136 |
| 3,292,684 A | * | 12/1966 | Jines ........................... 135/115 |
| 4,174,134 A | * | 11/1979 | Mathis ........................ 296/136 |
| 4,373,569 A | * | 2/1983 | Barettella ................... 160/263 |
| 4,432,581 A | * | 2/1984 | Guma .......................... 296/98 |
| 4,596,418 A | * | 6/1986 | Koh ............................ 296/136 |
| 4,657,298 A | * | 4/1987 | Yong O ....................... 296/136 |
| 4,718,711 A | * | 1/1988 | Rabbit ........................ 296/136 |
| 4,720,135 A | * | 1/1988 | Farina ......................... 296/136 |
| 4,727,898 A | * | 3/1988 | Guma .......................... 135/87 |
| 4,848,823 A | * | 7/1989 | Flohr et al. ................. 160/310 |
| 4,925,234 A | * | 5/1990 | Park et al. ................... 135/119 |
| 4,958,881 A | * | 9/1990 | Piros ...................... 160/370.22 |
| 4,969,679 A | * | 11/1990 | Eyb ............................ 296/124 |
| 5,022,700 A | * | 6/1991 | Fasiska et al. ............... 160/26 |
| 5,029,933 A | * | 7/1991 | Gillem ........................ 150/166 |
| 5,294,167 A | * | 3/1994 | Yu .............................. 160/24 |
| 5,503,212 A | * | 4/1996 | Lin ............................. 160/24 |
| 5,597,196 A | * | 1/1997 | Gibbs ......................... 160/326 |
| 6,131,643 A | * | 10/2000 | Cheng et al. ................. 160/24 |

* cited by examiner

Primary Examiner—Kiran Patel
(74) Attorney, Agent, or Firm—Jordan and Hamburg LLP

(57) ABSTRACT

A general-purpose trunk storing type body cover device for car includes a main device body formed so that a body cover for car can be delivered and wound up and a stand part on which the main device body is installed, disposed separately from the main device body, wherein an elastically supporting member is installed extensibly on the stand part so that the cover device can be stored in the state of being resiliently supported between the inner walls of a trunk room by the elastically supporting member. The body cover device prevents a car body from being damaged and eliminates the need for modification of the trunk room for installation of the body cover device.

28 Claims, 13 Drawing Sheets

BODY COVER DEVICE FOR CAR

CROSS-REFERENCE TO THE RELATED APPLICATION

This patent application is a continuation-in-part application of Ser. No. 09/719,966 filed on Dec. 18, 2000.

TECHNICAL FIELD

The present invention relates to a body cover device for car adapted to cover a car body with a body cover and, more particularly, to a body cover device for covering the car body with the body cover, whereby the body cover can be developed over the car body and stored in the body cover device with a one-touch operation.

BACKGROUND TECHNOLOGY

Various types of body cover devices for covering a car body with a body cover are known.

One type of the body cover device is configured such that a main device body with a body cover stored therein during non-use is integrally mounted on supporting member that firmly. supports the main device body. This type of the body cover device, however, may suffer from the difficulty that the main device body is less firmly secured to a car body and it is difficult to pull the body cover from the main device body. Such body cover device is disclosed, for example, in U.S. Pat. No. 5,503,212, U.S. Pat. No. 5,022,700 to Fasiska, and U.S. Pat. No. 6,131,643 to Cheng et al.

Another known arrangement of a body cover device for car is to simply mount or demount a body cover for car, as disclosed to the public by Japanese Patent Application Laid-open No. 8-104,142 (104,142/1996).

This body cover device arrangement includes a porch mounted on the reverse of a trunk lid for storing the body cover connected at its end to the porch. The car body is covered simply by pulling the body cover at its end out of a gap between the base edge of the trunk lid and the edge of a trunk room opening, and is uncovered simply by pulling the body cover therein at the porch side. The body cover is stored in the porch provided on the reverse of the trunk lid.

Other known arrangements of body cover devices for car are such that the body cover is pulled out in a similar way but uncovered and stored in automatic processes.

For example, Japanese Utility Model Application No. 99,773/1989 (Laid-open No. 38,218/1991) discloses a body cover device that includes a winder for rotating a roller in the direction of winding-up, on which a body cover is wound, mounted on the reverse of a trunk lid, whereby the body cover can be normally stored in a trunk and a car body is covered by pulling the body cover at its end out of a gap formed between the base edge of the trunk lid and the edge of a trunk room opening, followed by spreading over the roof of the car body, similarly to the prior art as described above. The body cover is uncovered by operating the winder for automatically winding the body cover to be stored in the trunk on the roller.

The above-described prior arts involve the following outstanding problems, because either of the porch and the winder is mounted on the reverse of the trunk lid.

In order to mount the porch or the winder on the trunk lid, it has to be fixed to the trunk lid. At this end, the trunk lid has to be modified so as to adapt the porch or the winder.

The body cover for car may become considerably heavy; although a material for the body cover itself is thin, because it has to be wide enough to cover the car body. Therefore, the prior art arrangements for the body cover having the structures as described above may impose a load directly on the trunk lid even when the body cover is stored in the porch or when it is wound on the roller.

The trunk lid is not so much rigid from the point of view of the structure of the car body and the body cover is considerably heavy. Therefore, while the car is running with the body cover accommodated in the trunk, a great load may be applied to the trunk lid or to the mounting means for the porch or the winder, mounted on the reverse thereof. As a result, troubles such as a deformation of the trunk lid or falling of the mounting means may be caused to occur.

Therefore, it has been difficult to put the above-described prior art technology on storing the body cover device for car into practical use.

DISCLOSURE OF THE INVENTION

A body cover device for car according to the invention comprises a main device body for delivering a body cover to cover a car body and storing the body cover during non-use and a stand part for supporting the main device body in the trunk room, disposed separately from the main device body in the trunk room and firmly pressed against two interior walls of the trunk room. The main device body is connected to the stand part through supporting means so as to be movable between a first position at which the body cover is in use and a second position at which the body cover is in non-use and stored in said main device body. Further, the stand part supports the main device body so as to enable delivery of the body cover from the main device body and storage of the body cover in the main device body. Moreover, the stand part for supporting the main device body in the trunk room is disposed vertically in the trunk room and firmly pressed against two interior walls of the trunk room, thereby firmly securing the main device body with the body cover stored therein during non-use. In a preferred mode, the stand part is disposed vertically between an inner wall portion of a ceiling wall and an inner wall portion of a bottom wall of the trunk room.

For the body cover device according to the invention, the stand part comprises an elastically supporting member that elastically extends to firmly press said stand part against one of the two interior walls of the trunk room and support said stand part in the trunk room.

Further, the elastically supporting member elastically extends until an end of the elastically supporting member contacts with one of the interior walls of the trunk room and firmly presses the stand part against the one of the two interior walls thereof to support the stand part in the trunk room. In a specific mode, the elastically supporting member extends upwardly until a top of the elastically supporting member contacts with a rear face of the upper interior wall of the trunk room to firmly press the stand part against the two interior walls of the trunk room.

In other words, the elastically supporting member is installed extensibly on the stand part so that the cover device can be stored in the state of being resiliently supported between the inner walls of the trunk room. Further, the elastically supporting member can be resiliently supported in the vertical in the trunk room so that the cover device can be formed to be resiliently supported at the most structurally rigid position in the trunk room.

The above arrangement of the body cover device according to the invention can store the body cover in the trunk room in an easy arrangement without modifying the structure of the trunk room and damaging the body cover and the trunk room.

For the body cover device according to the invention, the main device body is oscillatably installed on the stand part disposed in the vertical so as to be supported at its spring-up position during use and suspended during non-use. This arrangement for the main device body can provide easy handling during covering the car body and stable storage of the relatively heavier body cover in the trunk room during non-use. Further, the body cover stored in a downward suspended state permits the least possible load on the stand part during running even on a bad road and ensures improved durability.

As the main device body is provided with a delivery-and-windup port through which to deliver the body cover and wind it up so as to face a gap formed between the base edge of the trunk lid and the edge of the trunk room opening, delivery of the body cover is ensured at its end from the gap to the side of the rear glass. Therefore, a user can pull the body cover out easily and more conveniently.

The main device body comprises a drum on which the body cover is wound and driving means for rotating the drum to the direction of delivery of the body cover, so that the body cover can be semi-automatically delivered from the main device body and cover the car body of the car very easily.

Moreover, the driving means for rotating the drum in the direction of delivery of the body cover includes a delivery shaft mounted with a spring and connected to the drum with the body cover wound thereon via a one-way clutch. Further, the driving means is provided with energy accumulating means for resiliently acting the spring with the rotation of the delivery shaft in the opposite direction of delivery of the body cover. Therefore, the delivery shaft can be rotated with the resilience of the spring following the operation of the energy accumulating means to allow easy delivery of the body cover by simple mechanical operation.

Furthermore, the drum with the body cover wound thereon may be provided with a winder for winding the delivered body cover to allow automatic winding-up and storage of the body cover in the trunk room.

The body cover according to the invention includes a pair of core materials extending in parallel to the direction of delivery and winding-up. This can prevent the deformation of the body cover during delivery and winding-up and permits a smooth delivery and winding-up of the body cover.

The main device body may be detachably mounted on the stand part so that the main device body can be removed and stored during non-use and easily mounted during use. Further, this configuration of the main device body can provide wider space in the trunk room and easier handling performance.

Furthermore, the body cover device according to the invention includes the stand part comprising a pair of columns and each column is provided with an outside cylinder disposed upright on the bottom wall of the trunk room, a bottomed inside cylinder slidably arranged in the outside cylinder with the main device body mounted thereon oscillatably, a bar slidably arranged in the inside cylinder and provided with a contact member at the end so as to firmly press the interior wall of the trunk room, and a spring interposed between the bottom of the bar and the bottom of the inside cylinder. This configuration of the stand part can be fixed in the trunk room in a simple manner and ensure firm attachment between the two interior walls of the trunk room, eventually firmly securing the main device body to the stand part.

Moreover, the stand part may be provided with an engagement means between the bar and the inside cylinder so as to lock the bar to the inside cylinder at the position at the bar is pushed down. Therefore, this arrangement for the body cover device can easily fix the stand part into the trunk room.

Further, the stand part may be disposed so as to be transferable between two locations in the trunk room. At this end, the stand part comprises a supporting stand part and a fixing stand part associated with the supporting stand part. The main device body is supported on the supporting stand part so as to be transferable between the two location when the depth of the trunk room is very deep so that the main device body is too far to allow the body cover to be delivered from the delivery-and-windup port to the gap through which the body cover to be delivered. This structure of the stand part allows effective use of a space of the trunk room.

Moreover, the stand part comprises a pair of columns for supporting the main device body and each is provided with the elastically supporting member.

The column is provided with an outside cylinder disposed upright on a leg seat; a bottomed inside cylinder slidably mounted in the outside cylinder and mounted with the main device body so as to movable upwardly and downwardly; a bar slidably mounted in the inside cylinder and provided with a contact member at the end so as to firmly contact with a one interior wall of the trunk room; and a spring interposed between the bottom of the bar and the bottom of the inside cylinder.

For the body cover device according to the invention, it is to be noted that the elastically supporting means comprises the bar slidably mounted in the inside cylinder; the spring interposed between the bottom of the bar and the bottom of the inside cylinder; a threaded bar threadedly secured to the bar for adjusting a projection length of the contact member; and the contact member mounted on the bar so as to firmly contact with one of the interior walls of the trunk room.

The body cover device according to the invention is further configured in such a manner that the main device body is connected to the stand part through supporting means. The supporting means may comprise a body arm connected resiliently to the main device body and a supporting arm connected to the stand part and supported on said stand part.

The body arm and the supporting arm through which to connect the main device body to the stand part may be arranged so as to resiliently move the main device body so as to take a raised position closer to the gap through which to pull the body cover outside when the body cover device is in use and to take an upward directed position a little closer to the stand part and generally horizontally yet a little diagonally downward from the raised position when it is in non-use.

Alternatively, the body arm of the supporting means may comprise an upper body arm and a lower body arm; the supporting arm comprises an upper supporting arm and a lower supporting arm, mounted on the stand part at an interval; the upper body arm is connected to the main device body at a top end thereof and to a top of the lower body arm at a base end thereof and supported On the upper supporting arm; the lower body is connected to the lower supporting arm at a base end thereof; a link arm is connected at one end thereof to the upper supporting arm and at the other end thereof to the upper body arm to support the upper body arm; a spring means is mounted at a one end thereof on the stand part and mounted at the other end thereof on a connection between the upper body arm and the lower body arm; the spring means is biased to raise the body arm upward as the main device body is pulled diagonally upward and farther from the stand part to the first position from the second position by the body cover in use and the spring is resiliently back diagonally downward and closer to the stand part to the second position from the first position when the body cover in non-use is stored in the main device body; and the main device body in the first position takes a posture in which the main device body is held upward on top of the upper body arm in a position farther from the stand part and said main device body takes a posture in which the main device body is held upward on top thereof in a position closer to the stand part.

BEST MODES FOR CARRYING OUT THE INVENTION

Figure 1:
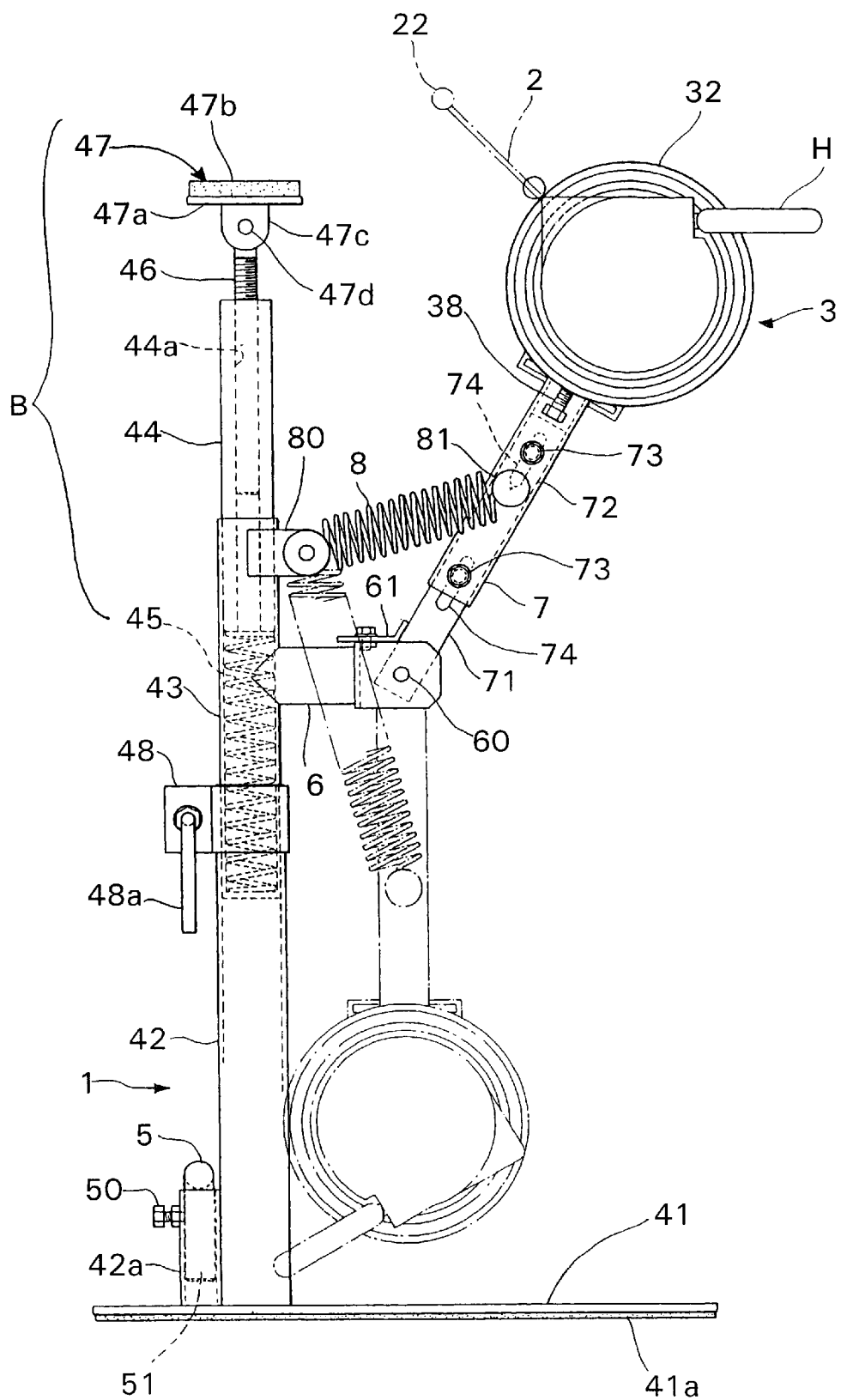
FIG. 1 is an explanatory drawing in a side view of a body cover device according to a first embodiment.

A body cover device for covering a car body with a body cover according to the invention comprises a main device body for delivering the body cover when to cover the car body with the body cover and storing the body cover when it is in non-use, and a stand part disposed between two interior walls of a trunk room to firmly press the stand part therebetween and to place the body cover at a fixed position. Further, the stand part is disposed separately from the main device body as a separate member and connected to the main device body through supporting means that in turn moves resiliently or elastically to transfer the main device body between a first position when use and a second position when non-use.

In an alternative mode, the stand part as a separate member is disposed vertically between the two interior walls of the trunk room, more specifically, between the upper and lower interior walls thereof, thereby permitting the stand part to be firmed secured therebetween.

For example, the stand part may be configured in a nesting form consisting of an outside cylinder disposed upright on a leg seat, an bottomed inside cylinder slidably arranged in the outside cylinder, and a bar slidably arranged in the inside cylinder and provided with a contact member at the end. On the bottomed inside cylinder, there is oscillatably mounted the main device body. Further, a spring is interposed between the bottom of the bar and the bottom of the inside cylinder. With the above-described arrangement of the stand part, the inside cylinder can be fixed at a desired position and the bar can be kept energized or biased upward by the spring. Therefore, the bar of the stand part can firmly press the contact member against one of the inner walls of the trunk room. By firmly pressing the contact member against the one inner wall of the trunk room, the leg seat disposed on the opposite side can also be firmly pressed against the other inner wall of the trunk room, thereby firmly securing the stand part between the two inner walls of the trunk room.

This structure allows resilient support of the device at the most structurally rigid position in the trunk room, resulting in the body cover device to be stably stored and arranged in the trunk room and the device to be simplified. It is also preferable that engagement means is provided between the bar and the inside cylinder to allow locking of the bar to the inside cylinder al the position at which the bar is pushed or depressed down. This structure allows easy fixing work in the trunk lid.

The stand part may be provided with an elastically supporting member in order to firmly support the stand part between the interior walls of the trunk room. The elastically supporting member is arranged so as to elastically extend toward one of the interior walls of the trunk room so as to contact therewith and firmly press the elastically supporting member, i.e., the stand part, against the one interior wall thereof.

The elastically supporting member may be installed extensibly on the stand part so that the cover device can be stored in the state of being resiliently supported between the inner walls of the trunk room by the elastically supporting member.

It is preferable that the elastically supporting member be resiliently supported vertically between two upper and lower walls of the trunk room, although it may be disposed crosswise or widthwise between opposite side walls of the trunk room.

The elastically supporting member elastically extends until an top end of the elastically supporting member contacts with one of the interior walls of the trunk room and firmly presses the stand part against the one of the two interior walls thereof to support the stand part in the trunk room.

By firmly pressing the elastically supporting member against the one interior wall of the trunk room, the stand part on the opposite side is likewise pressed firmly against the other interior wall thereof, thereby firmly securing the stand part between the two interior walls of the trunk room.

The body cover device according to the invention may be configured such that the stand part comprises a pair of columns for supporting the main device body and each is provided with the elastically supporting member.

Each of the pair of the column may be provided with an outside cylinder disposed upright on a leg seat to be secured on one of the two inner walls of the trunk room; a bottomed inside cylinder slidably mounted in the outside cylinder and mounted with the main device body so as to movable upwardly and downwardly; a bar slidably mounted in the inside cylinder and provided with a contact member at the end so as to firmly contact with a one interior wall of the trunk room; and a spring interposed between the bottom of the bar and the bottom of the inside cylinder.

Further, engagement means may be provided between the bar and the inside cylinder so as to be locked to the inside cylinder at a position at which the bar is pushed down.

It is to be noted herein that the elastically supporting means may comprise the bar slidably mounted in the inside cylinder; the spring interposed between the bottom of the bar and the bottom of the inside cylinder; a threaded bar threadedly secured to the bar for adjusting a projection length of the contact member; and the contact member mounted on the bar so as to firmly contact with one of the interior walls of the trunk room.

Alternatively, the stand part is disposed so as to be movable in the trunk room between a position at which the body cover is in use and a position at which the body cover is in non-use. At this end, the stand part comprises a supporting stand part and a fixing stand part; the supporting stand part is disposed to support the main device body; the fixing stand part is firmly fixed between a ceiling wall and a bottom wall of the trunk room; a leg seat for the fixing stand part is formed in a rail structure and mounted on the bottom wall of the trunk room; a leg seat for the supporting stand part is mounted on the leg seat for the fixing stand part so as to be slidable transversely; the supporting stand part with the main device body supported thereon is slidably moved on the leg seat for the fixing stand part to a position in which the body cover is to be delivered; and the supporting stand part is slidably moved on the leg seat for the fixing stand part back to a position in which the main device body is stored in the trunk room.

For the body cover device according to the invention, the main device body may include a drum on which the body cover is wound and driving means for rotating the drum in the direction of delivery of the body cover.

The driving means of the main device body may include a delivery shaft with a spring such as a spiral spring secured thereto, connected to the drum with the body cover wound thereon via a one-way clutch, and energy accumulating means for resiliently bending or yielding the spring of the delivery shaft and storing energy or resilient force in the spring by rotating the delivery shaft in the direction opposite to the direction of delivery of the body cover. The body cover is delivered onto the car body from the main device body by rotating the delivery shaft by means of the resilience or the energy of the spring. The energy accumulating means is not limited to a particular one and the energy accumulating means in any form may be used as long as it can resiliently bend or yield the spring of the main device body.

This structure of the main device body allows the easy and semi-automatic delivery of the body cover by mechanically simple operation, resulting in easy covering work.

Further, the drum of the main device body may be provided with a winder for winding up the body cover delivered. The winder can wind up the delivered body cover on the drum in an automatic way after unlocking locking means disposed so as to lock the body cover developed over the car body.

The structure of the stand part allows easy storage and arrangement of the body cover device in the trunk room without modifying or restructuring the trunk room or damaging the inside of the trunk room. Further, the body cover device in this structure enables easy delivery and winding-up of the body cover.

For the body cover device according to the invention, the main device body is connected to and supported on the stand part by the aid of supporting means in order to locate the main device body at a fixed position in the trunk room. The body cover device may be arranged so as for the main device body to be movable generally vertically, or crosswise or diagonally, between a first position at which the main device body is located when use and a second position at which it is located when non-use.

In a preferred mode, the main device body may be oscillatably installed on the stand part in the vertical so as to be supported at a sprung-up position during the period of use and to be stored at a suspended position during the period of non-use. In other words, the main device body may be disposed so as to be movable between two positions, that is, between a first position at which the body cover is in the state of use and a second position at which it is in the state of non-use.

More specifically, for example, the main device body may be raised upward from the second position to the first position when the body cover is being delivered and developed over the car body, and the main device body may be lowered from the first position to the second position at which the device body is stored in a downward suspended state in the main device body when the device body is released from covering the car body. In other words, the main device body is raised to an upper position, i.e., to a position closer to the rear glass, on the one hand, when the body cover is being delivered and developed over the car body, and the main device body is lowered to a lower position, i.e., to a position closer to the lower wall of the trunk room, on the other, when the body cover is in non-use.

In other words, the main device body may be pulled up to a first position, i.e., to an upper position closer to the rear glass, on the one hand, as the body cover is being delivered the main device body may be stored in a second position, i.e., in a position closer to the stand part, on the other hand, as the body cover is wound up in the main device body and stored therein. The second position at which the body cover is in the state of non-use and it is stored in the main device body is somewhat lower than the first position at which it is in the state of use because the main device body is pulled down to some extent by the resilient force of the supporting member, such as a spring, interposed between the main device body and the stand part for supporting the main device body on the stand part.

Alternatively, the main device body is pulled diagonally upward to the first position from the second position when the body cover is being delivered and developed over the car body and pulled diagonally downward from the first position to the second position closer to the stand part when said body cover is stored in said main device body. On the other hand, the main device body in the first position is located farther from the stand than said main device body in the second position. Further, each of the main device body in the first position and the main device body is in the second position is directed to the rear face of the upper interior wall of the trunk room.

Moreover, the main device body is installed on the stand part in such a manner that a delivery-and-windup port of the main device body is disposed to face a gap formed between a base edge of a trunk Id and an edge of a trunk room opening and to enable delivery of the body cover therethrough. The body cover stored in the main device body can be pulled out upward from the delivery-and-windup port and further upward over the car body through the gap therebetween. The body cover is then developed over the car body.

Specifically, the delivery-and-winding port of the main device body is provided in a cylindrical case storing the drum of the main device body and the delivery-and-wind-up port located where the main device body is supported in the state of being sprung up is directed to the gap formed between the base edge of the trunk lid and the edge of the trunk room opening.

This structure ensures delivery of the body cover at its end out of the gap to the side of a rear glass.

A delivery length can be properly set, such that the body cover is grasped at its end of and pulled from the outside of the trunk room. After pulled, the body cover can be spread over the car body and locked to the car body by using locking means such as a hook provided on the body cover.

In order to prevent the deformation of the body cover when delivered and wound up, a pair of core materials extending in parallel to the direction of wind-up can be provided in the body cover.

Although it is difficult to deliver and move a general soft and flexible body cover out of the trunk room along the rear glass, the core materials permit such movement to be smoothed and ensures in-order winding of the body cover to be stored on the drum. The core materials can favorably be elastic materials such as spring steel materials.

For the body cover device according to the invention, the main device body may be connected to the stand part through supporting means so as to be movable between the first position and the second position.

The supporting means may comprise a body arm connected resiliently to the main device body and a supporting arm connected to the stand part and supported on the stand part.

The body arm is connected to the stand part by the aid of a supporting member such as a spring so as to resiliently move the main device body between the first position and the second position.

More specifically, the body arm may comprise an upper body arm and a lower body arm and the supporting arm may comprise an upper supporting arm and a lower supporting arm, mounted on the stand part at an interval. The upper body arm is connected to the main device body at a top end thereof and to a top of the lower body arm at a base end thereof and supported on the upper supporting arm, and the lower body arm is connected to the lower supporting arm at a base end thereof. Further, a link arm is connected at one end thereof to the upper supporting arm and at the other end thereof to the upper body arm to support the upper body arm. Moreover, a spring means is mounted at a one end thereof on the stand part and mounted at the other end thereof on a connection between the upper body arm and the lower body arm.

In other words, the spring means may be biased to raise the body arm upward as the main device body is pulled diagonally upward and farther from the stand part to the first position from the second position by the body cover in use and the spring is resiliently back diagonally downward and closer to the stand part to the second position from the first position when the body cover in non-use is stored in the main device body. The main device body in the first position takes a posture in which the main device body is held upward on top of the upper body arm in a position farther from the stand part and the main device body takes a posture in which the main device body is held upward on top thereof in a position closer to the stand part.

In an alternative mode, the body arm connected resiliently to the main device body may be provided with a short rail member is mounted on top thereof. On the other hand, the main device body may be provided with a sliding member. Therefore, the main device body may be detachably engageable with the body arm through the short rail member and a locking member.

The specific embodiments of this invention are described with reference to the accompanying drawings.

First Embodiment

Figure 2:
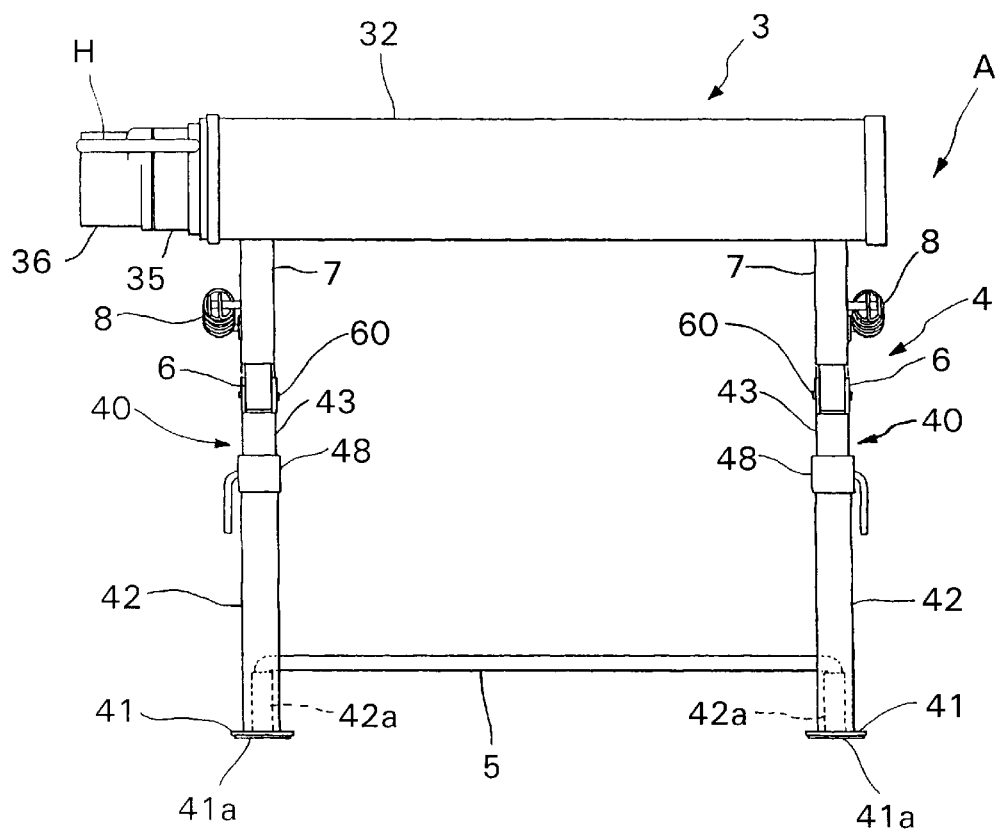
FIG. 2 is a front view of the cover device.
Figure 3:
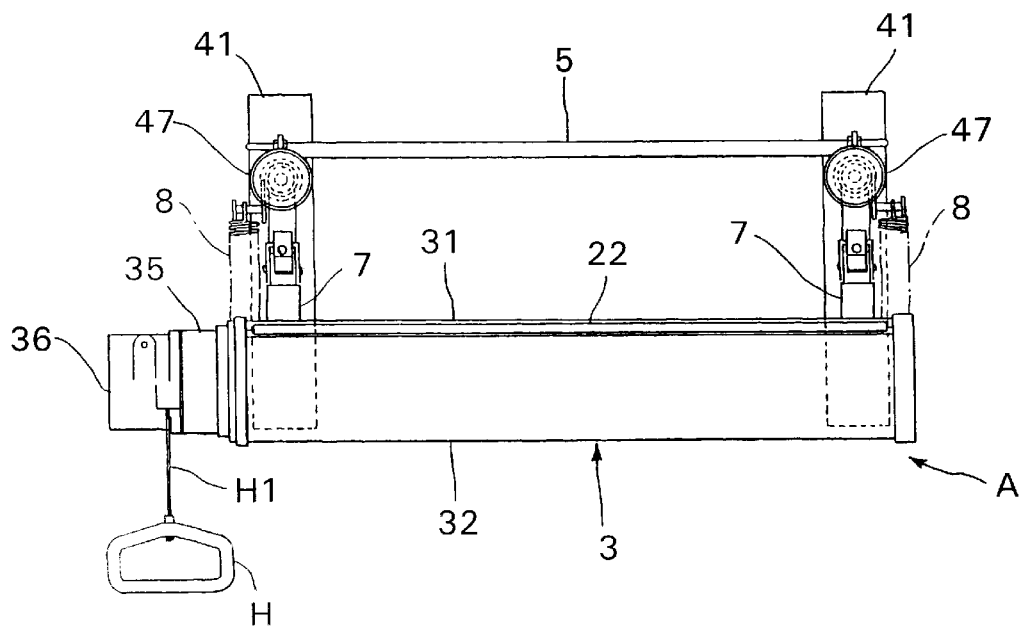
FIG. 3 is a plan view of the cover device.
Figure 4:
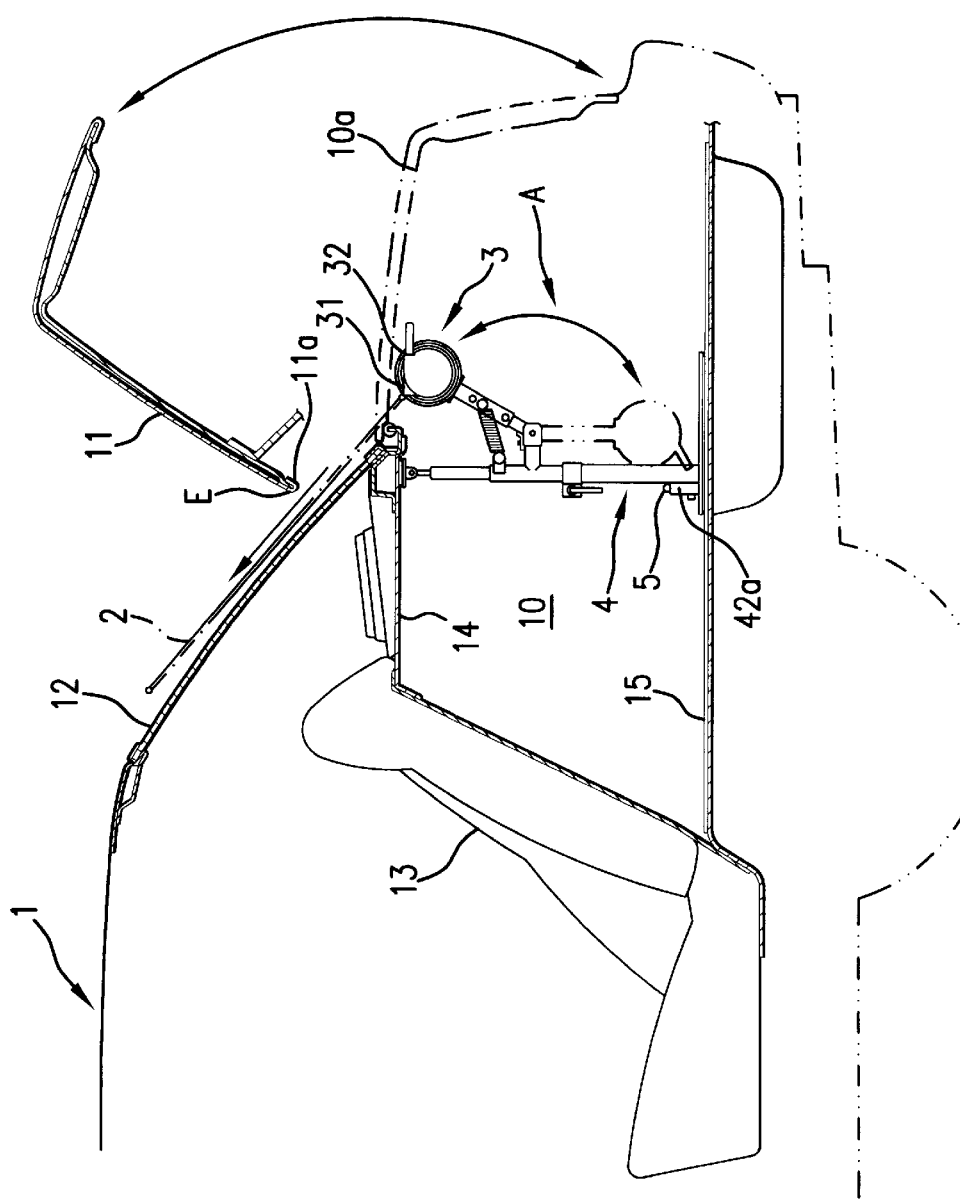
FIG. 4 is an explanatory drawing showing the condition of the cover device during the period of use.

FIG. 1 is an explanatory drawing in a side view of a body cover device (thereinafter referred to as "the cover device", too) A according to the first embodiment, FIG. 2 is a front view of the cover device A, FIG. 3 is a plan view thereof, and FIG. 4 is an explanatory drawing showing the state of use of the cover device A.

As shown in FIG. 4, the cover device A is formed to be stored in a trunk room 10 of a car 1 in use. A body cover 2 for car can be semi-automatically delivered and to and developed over the car body and automatically wound up to close and store the body cover. In FIG. 4, reference numeral 11 represents a trunk lid, reference numeral 12 represents a rear glass and reference numeral 13 represents a rear sheet.

As shown in FIG. 1 through FIG. 3, the cover device A comprises a main device body 3 formed so that the body cover 2 can be delivered from the main device body 3 for development over a car body and wound up for storage therein and a stand part 4 on which the main device body 3 is oscillatably installed in the vertical and which is formed as a separate member from the main device body, wherein an elastically supporting member B is installed extensibly on the stand part 4 so that the cover device A can be stored in the state of being resiliently supported between the inner walls of the trunk room 10 by the elastically supporting member B.

According to this embodiment, the elastically supporting member B can be resiliently supported in the vertical and laid between a ceiling wall 14 and a bottom wall 15 of the trunk room 10, as shown in FIG. 4.

More specifically, as shown in FIG. 1 through FIG. 4, the stand part 4 is formed as a separate member from the main device body and firmly disposed vertically in the trunk room 10 between the inner walls of the trunk room 10 by the aid of the elastically supporting member B that is provided in the stand part 4 so as to elastically extend vertically until the top edge of the elastically supporting member B abuts with the rear face of the inner wall portion of the ceiling wall 14 of the trunk room 10 to firmly press the elastically supporting member B against the ceiling wall 14.

On the other hand, the main device body 3 is connected to the stand part 4 through supporting means so as to be movable upwardly and downwardly. The connecting member is composed of a supporting arm 6 and a body arm 7, one edge of the supporting arm 6 being fixed to a portion of the stand part 4 and the other edge thereof being connected to one edge of the body arm 7. The other edge of the body arm 7 is fixed to the main device body 3, and the body arm 7 is connected to the stand part 4 through a spring 8. By the spring force of the spring 8, the main device body 3 can be moved upwardly and downwardly. The main device body 3 is also disposed so as to take an upper position when the body cover 2 is in use and to take a lower position when the body cover 2 is not in use.

A detailed description will be given regarding the structure of the cover device A. First, the stand part 4 with the device body 3 associatively installed thereon will be described hereinafter with reference to FIG. 1 through FIG. 3.

The stand part 4 consists of a pair of columns 40 and 40 each disposed upright at a predetermined interval. Each of the columns 40 and 40 as an outside cylinder 42 disposed upright in the vicinity of one end of a long plate leg seat 41 with a shock absorbing and anti-slipping material 41a, such as a rubber, pasted on the lower face thereof. A bottomed inside cylinder 43 is slidably fitted in the outside cylinder 42 and a bar 44 having a female screw portion 44a formed at the center is slidably fitted in the inside cylinder 43. Further, a spring, such as a coil spring 45, as used in this embodiment, is provided between the bottom of the bar 44 and the inside cylinder 43 for energizing the bar 44 upward, that, for biasing the bar upwardly.

To the female screw portion 44a of the bar 44, a threaded bar 46 is threadedly secured with a contact member 47 pivotally mounted at the end in an oscillatable manner for adjusting a projection length. The contact member 47 is composed of a disc 47a and the shock absorbing material 47b such as a rubber pasted at the top face thereof on the disc 47a. Further, the disc 47a is provided with a bracket 47c associatively provided on the lower face thereof. The bracket 47c is further connected to the upper end portion of the threaded bar 46 via a pivotal shaft 47d.

The elastically supporting member B is constituted by the coil spring 45, the bar 44, the threaded bar 46, and the contact member 47. The elastically supporting member B can support the cover device A between the ceiling wall 14 and the bottom wall 15 of the trunk room 10.

Each of the columns 40 and 40 is provided with a small cylinder 42a at the lower side of the circumference of the outside cylinder 42, and a connecting bar 5 bent at its ends is bridged between the small cylinders 42a for stabilizing the right and left columns 40 and 40.

The inside cylinder 43 is provided with the supporting arm 6 protruding generally horizontally from an approximately central portion thereof, and the base end of the body arm 7 is oscillatably connected to the end of the supporting arm 6 via the pivotal shaft 60. The device body 3 is associatively provided at the end of the body arm 7.

The main device body 3 can be rotated about its axis, as required, and its installation position can be changed using an adjusting bolt 38.

The body arm 7 consists of a first arm 71 connected to the supporting arm 6 and a second arm 72 secured to the first arm 71 so as to be slidable in the longitudinal direction. Therefore, the body arm 7 can be set at a proper length by inserting a fixed bolt 73 passing through the second arm 72 between slits 74 and 74 provided in the first arm 71.

A coil spring 8 for use in supporting the main device body 3 of the cover device A is interposed between an approximately central portion of the body arm 7 and the vicinity of the approximately upper end of the inside cylinder 43. When the car body of the car 1 is to be covered with the body cover 2, the main device body 3 can be supported at its spring-up position close to a user, so that the main device body 3 can be operated with ease. In the drawings, reference numeral 61 represents a stopper for restricting the spring-up position of the main device body 3 and reference numerals 80 and 81 represent each a coil spring mounting bracket.

On the other hand, when the body cover 2 is not in use, the main device body 3 is kept suspended at a lower position. As the body cover 2 is considerably heavy, so that the main device body 3 is stayed in a downward suspended state and stably stored in the trunk room 10. Otherwise, that is, if the main device body 3 with the heavy body cover stored therein would be suspended in an overhung state, the main device body 3 may become unstable.

As a result, the cover device A becomes easy and convenient to handle during the period of use, and the least possible load is applied to the stand part 4 supporting the main device body 3 even during running on a bad road, possibly preventing damage to the base end of the supporting arm 6 secured to the inside cylinder 43. In FIG. 1, reference numeral 48 represents a tightener or a fastener mounted at the upper end portion of the outside cylinder 42 to allow the inside cylinder 43 to be fixed at a given height by the operation of a lever 48a of the tightener or fastener 48. Reference numeral 50 represents a fixing bolt for fixing the connecting bar 5 at its bent end 51 to the small cylinder 42a.

Then, the structure of the main device body 3 of the body cover device A is described with reference to FIG. 5.

Figure 5:
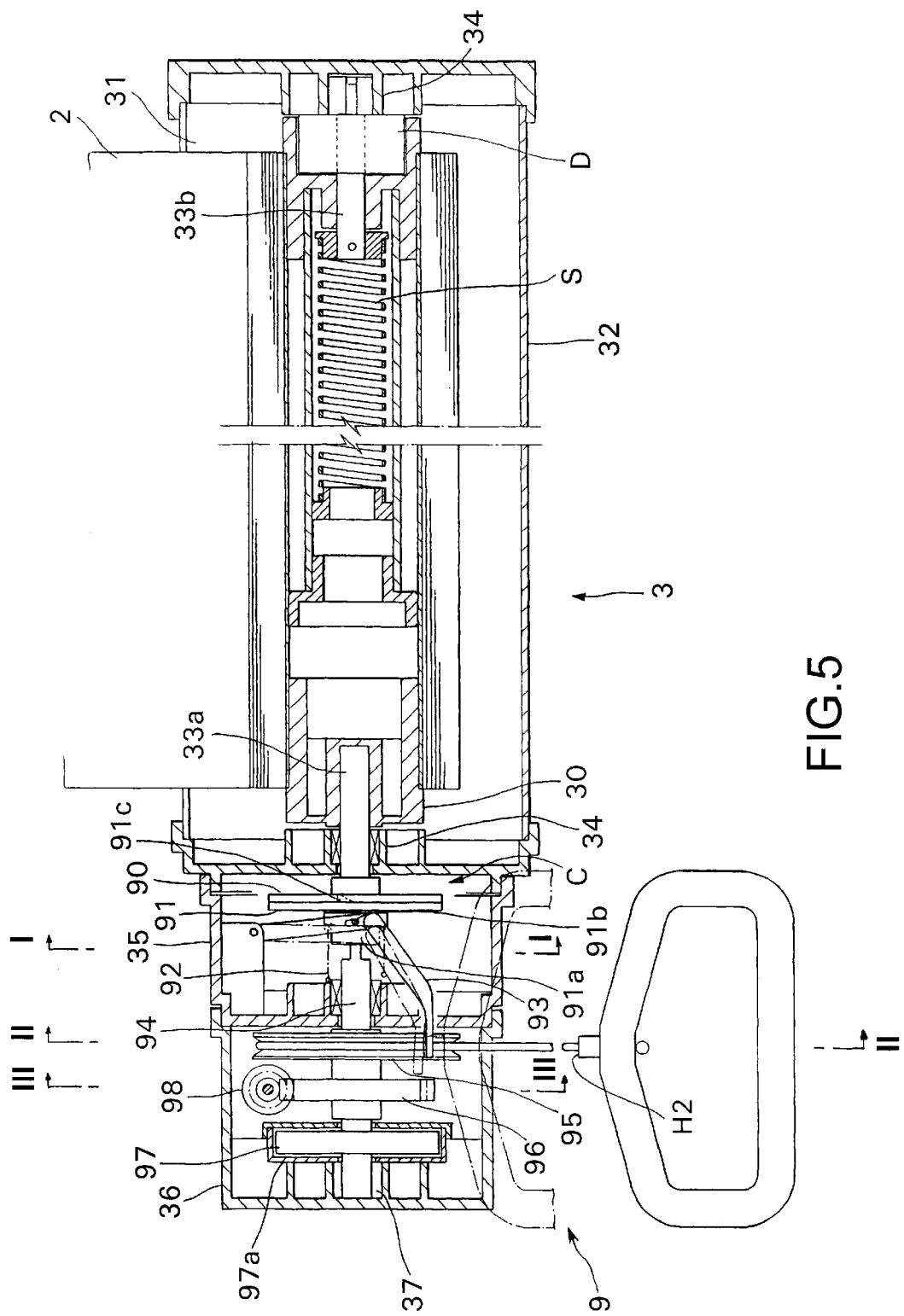
FIG. 5 is an explanatory drawing in a sectional view of a main device body.

As shown in FIG. 5, the main device body 3 includes a drum 30 with the body cover 2 wound thereon and a delivery device 9 as driving means for rotating the drum 30 in the direction of the delivery of the body cover 2 to cover the car body. The drum 30 is rotatably stored in a cylindrical exterior case 32 having a delivery-and-windup port 31. Reference numerals 33a and 33b represent each a rotating shaft of the drum 30 and reference numeral 34 and 34 represent each a bearing.

The drum 30 is operatively coupled with a clutch disc 90 at an end of the rotating shaft 33a, which is in turn operatively coupled with a one-way clutch C of the delivery device 9. The rotating shaft 33a is disposed protruding through the bearing 34 at one side into a protecting case 35 for the delivery device 9. The protecting case 35 is detachably mounted at one end of the exterior case 32.

The protecting case 35 is also provided with a thrusting plate 91 that in turn is energized to the clutch disc 90, that is to say that is biased toward the side of the clutch disc 90, by an energizing or biasing spring 92. The thrusting plate 91 is further disposed so as to be slidable on a driving shaft 94 acting as a delivery shaft of the delivery device 9 via a boss portion 91a that in turn is provided with a pin 91b in a protruded form so as to be engageable with a link lever 93.

Figure 6:
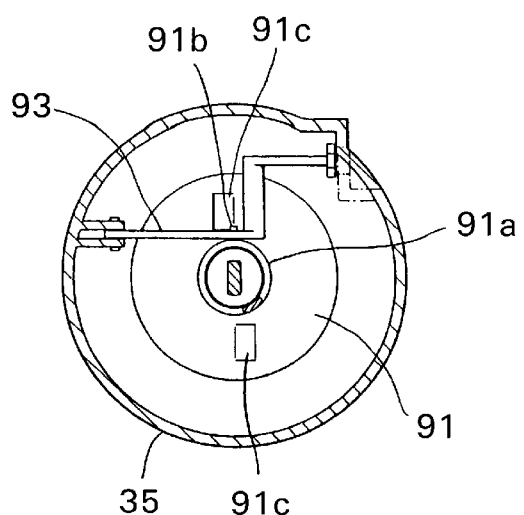
FIG. 6 is a sectional view along a line I—I shown in FIG. 5.

As shown in FIG. 6, the thrusting plate 91 has pawl portions 91c and 91c that are to be engaged with the clutch disc 90 only in the direction of delivery of the body cover 2.

A cap-shaped case 36 is detachably mounted on the outside of the protecting case 35, and the driving shaft 94 is disposed protruding from the protecting case 35 into the cap-shaped case 36. The edge of the driving shaft at the cap-shaped case side is supported by a bearing 37.

On the outside of the driving shaft 94, a pulley 95, a worm wheel 96 and a spiral spring 97 are arranged in order from the side of the protecting case 35. Reference numeral 97a represents a spring case for storing the spiral spring.

Figure 7:
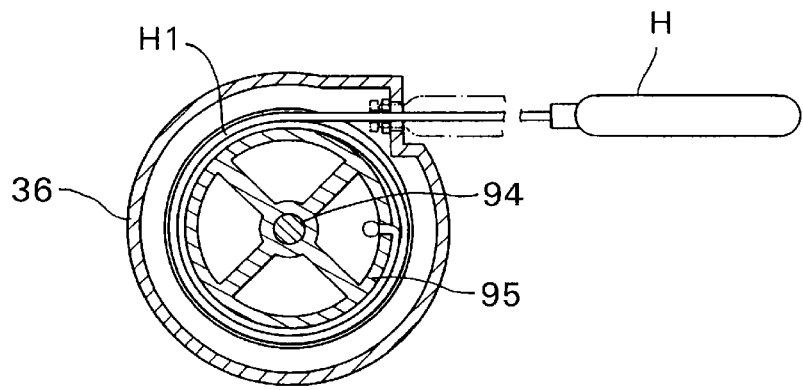
FIG. 7 is a sectional view along a line II—II shown in FIG. 5.

As shown in FIG. 7, a rope Hi is connected and fixed to the pulley 95 at the base end thereof and wound on the pulley 95 and to a handle H at the other end. As the handle H is pulled, then the worm wheel 96 and the spiral spring 97, together with the pulley 95, are rotated in the direction opposite to the direction of delivery of the body cover 2.

Figure 8:
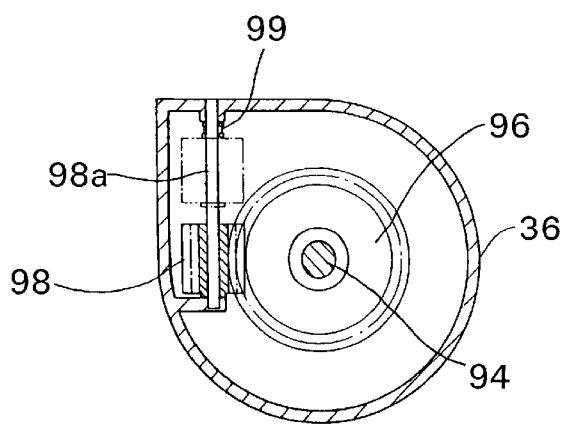
FIG. 8 is a sectional view along a line II–III shown in FIG. 5.

As shown in FIGS. 5 and 8, a resistance worm 98 energized or biased by the spring 99 is in mesh with the worm wheel 96. Reference numeral 98a represents a worm shaft.

As the worm wheel 96 rotates, the worm 98 is shifted to the side of the spring 99, as shown in FIG. 8, and then come to fail to work as resistance. Therefore, the handle H can become pulled with ease and the spiral spring 97 can resiliently act to accumulate energy. At this time, the one-way clutch C runs idle to cause no rotating the rotating shaft 33a of the drum 30.

When the handle H is released, the driving shaft 94 is rotated by the resilience of the spiral spring 97. Therefore, the rotating force is transmitted to the driving shaft 94, the one-way clutch C, and then the rotating shaft 33a in sequence to deliver the body cover 2 from the main device body 3. At this time, the worm 98 is in mesh with the worm wheel 6 again to produce meshing resistance that reduces the rotating speed of the driving shaft 94. Therefore, the body cover 2 can be delivered at a proper speed. Although the delivery length of the body cover 2 can be set properly, it may be such that the end of the body cover 2 is grasped and pulled from the outside of the trunk room 10.

As the spiral spring 97 winds up the rope H1 to its full length, the protruded end H2 of the handle H pushes up the link lever 93, as shown by a chain line in FIG. 5, so that the thrusting plate 91 of the one-way clutch C is separated from the clutch disc 90 to break the transmission between the delivery device 9 and the drum 30.

For the cover device A according to this embodiment, the drum 30 is provided with a winder D for winding up the body cover 2 delivered.

As shown in FIG. 5, a coil spring S is provided in the drum 30 and connected at one end to the side of the drum 30 and connected at the other end to the side of the rotating shaft 33b. The winder D with a stopper having a known structure is mounted on the rotating shaft 33b.

In this structure, as the drum 30 is rotated for delivering the body cover 2, the body cover 2 can be delivered up to a given position while energy is being accumulated in the coil spring S. Further, as the body cover 2 is pulled slightly at that position, the stopper of the winder D is set free, so that the drum 30 is turned back with the resilience of the coil spring S to thereby wind the body cover 2 up.

Figure 9:
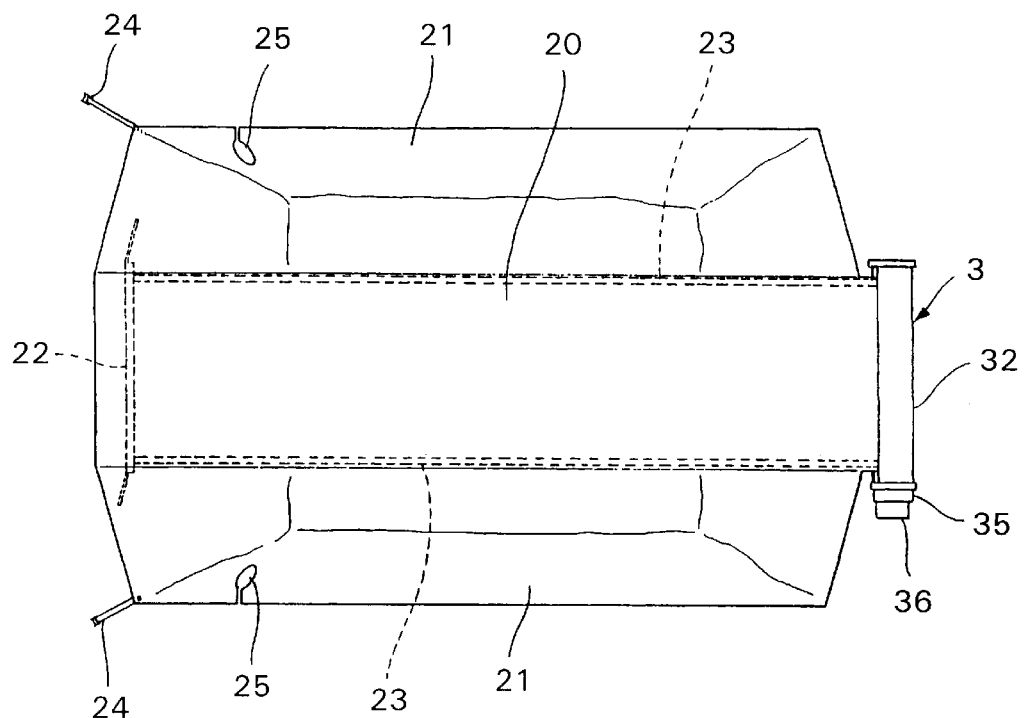
FIG. 9 is an explanatory drawing showing a body cover.
Figure 10:
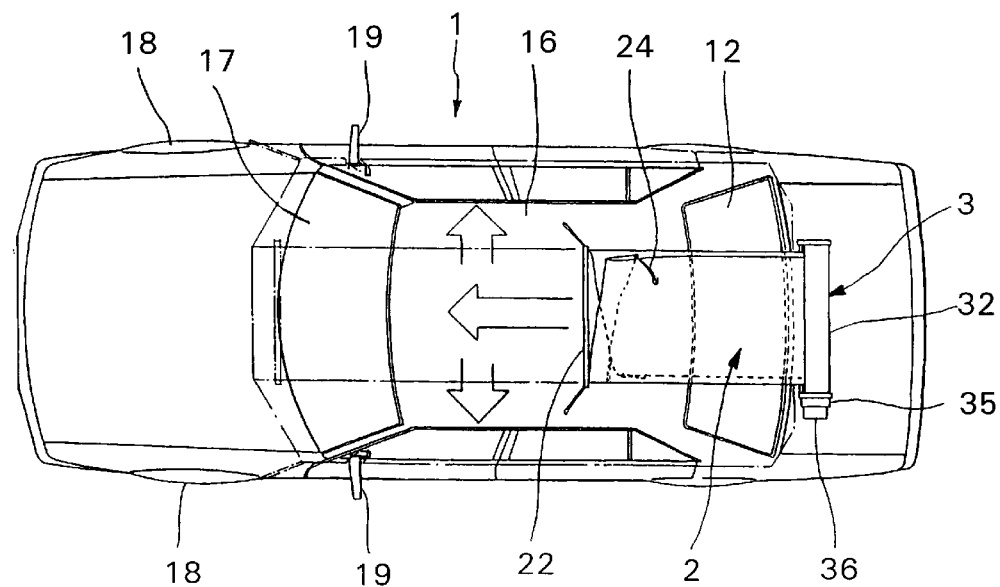
FIG. 10 is an explanatory drawing showing the condition of the body cover during the period of use.

As shown in FIGS. 9 and 10, the body cover 2 to be used in this embodiment consists of a main cover portion 20 for covering the car body from the rear glass 12 through a roof 16 to a front glass 17, and sleeve portions 21 and 21 extending to the right and left thereof, respectively, and seamed therewith so as to correspond to the shape of the car body. A grip bar 22 is mounted at a top end of the main cover portion 20. At the right and left sides of the main cover portion 20, namely, a joint between the sleeve portions 21 and 21, a pair of core materials 23 and 23, each formed of a spring steel material, are provided for preventing the deformation of the body cover 2 during delivery and wind-up.

The core material 23 can provide the body cover 2 with rigidity and flexibility, thereby ensuring the easy delivery and movement of the body cover 2 from the trunk room 10 along the rear glass 12. At the same time, the body cover 2 can be easily wound up on the drum 30 in a regular arrangement.

In FIG. 9, reference numeral 24 represents a hook for locking the body cover 2 to the body of the car 1, and reference numeral 25 represents a cut portion for avoiding interference with a door mirror 19 (FIG. 10). In FIG. 10, reference numeral 18 represents a fender to which the hook 24 can be locked.

Now, a description will be given regarding the operation of the cover device A according to this embodiment.

As shown in FIG. 4, a trunk lid 11 is opened and the cover device A is installed between a corner ceiling wall 14 formed of a relatively rigid frame and the bottom wall 15 of the trunk room 10.

The inside cylinder 43 of the stand part 4 is then set to a given height, and the contact member 47 is pressed against the ceiling wall 14 and the bar 44 is turned to adjust the length of the threaded bar 46 to support the cover device A by an appropriate level of resilience. At this time, shock absorbing materials 41a and 47b are mounted on the leg seat 41 and the contact member 47 contacting the walls 14 and 15, respectively. This setting of the cover device A can prevent damage of the inside of the trunk room 10. Further, the cover device A according to this embodiment can be set with extreme ease in the trunk room 10.

As the body cover 2 is ready to be delivered and developed along the rear glass 12, the main device body 3 is raised to the spring-up position, that is, to the upper position. At this position, the installation position of the main device body 3 on the body arm 7 can be adjusted with the adjusting bolt 38 so as to locate a delivery-and-windup port 31 disposed in the exterior case 32 to correspond to a gap E formed between the base edge portion 11a of the trunk lid 11 and the corner edge portion of the trunk opening 10a, that is, so as to permit free delivery of the body cover 2 along the rear glass 12. If the main device body 3 would be mounted on the body arm 7 in advance so as to locate the delivery-and-windup port 31 to correspond to the gap E at the basic position, only fine adjustment for the installation position of the main device body 3 on the body arm 7 is needed in this case.

When the body cover 2 is to be delivered, the body cover 2 can be delivered simply by pulling the handle H of the main device body 3 to this side and then releasing it. As the handle is released, the drum 30 starts rotating by the energy accumulated in the spiral spring 97 to allow the body cover 2 to move along the rear glass 12 in a manner as described above. Further, the rotating speed of the drum 30 is optimized by the resistance of the worm 98 to provide a smooth delivery of the body cover 2 along the rear glass 12.

Turning now to FIG. 10, the delivered body cover 2 is grasped at its end and pulled out along the car body, followed by spreading the sleeves 21 and 21 of the body cover 2 to the right and left and hooking the body cover 2 to the car body with the hook 24. After the body cover 2 has been spread and developed over the car body, then the trunk lid 11 is closed.

As the body cover 2 is firmly hooked at its front side with the hook 24 and locked at its rear side with the trunk lid 11, the car body can be covered with the body cover 2 in a tightly tensile state. This embodiment allows the extremely simple and semi-automatic covering of the car body with the body cover 2 in the manner as described above.

On the other hand, when the body cover 2 is to be stored in the trunk room 10, the trunk lid 11 is opened and the winder D is operated by resetting the hook 24, folding the sleeves 21 and 21 over the main cover portion 20, and pulling the sleeves 21 and 21 slightly in the direction opposite to the winding-up direction of the body cover 2. As the winder D is operated, the drum 30 of the main device body 3 is rotated to permits the automatic winding up of the body cover 2. The body cover 2 is then stored in the trunk room 10 and the trunk lid 11 is closed.

Second Embodiment

The second embodiment of the present invention is described with reference to FIG. 11 through FIG. 15.

A structure of the body cover device in this second embodiment is basically similar to that of the first embodiment, except that the main device body 3 as described above in the first embodiment is detachably mounted on the stand part 4. Therefore, the structuring components in this embodiment identical to and similar to those in the first embodiment are provided with the same reference numerals.

Figure 11:
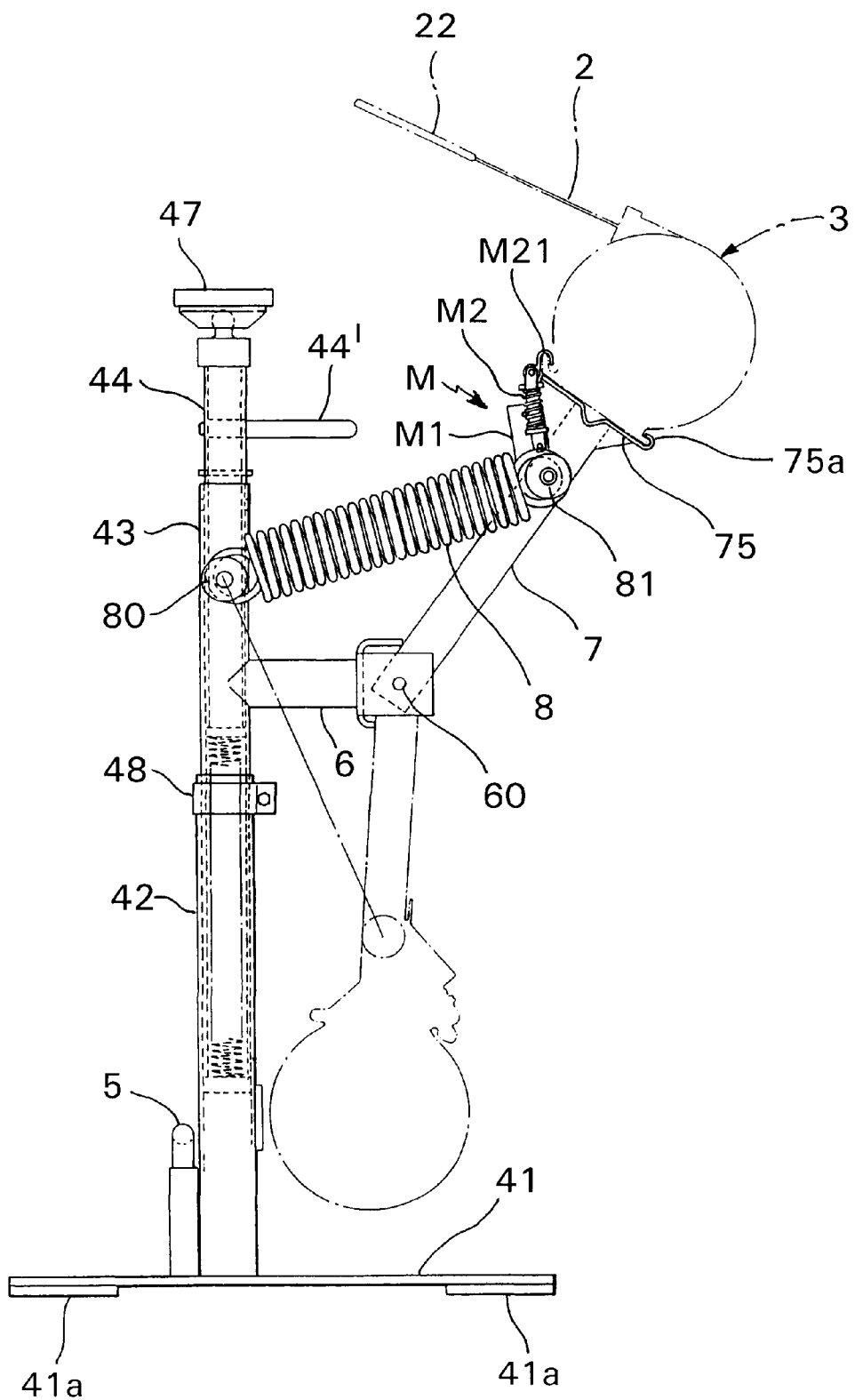
FIG. 11 is an explanatory drawing showing the cover device according to a second embodiment.
Figure 13:
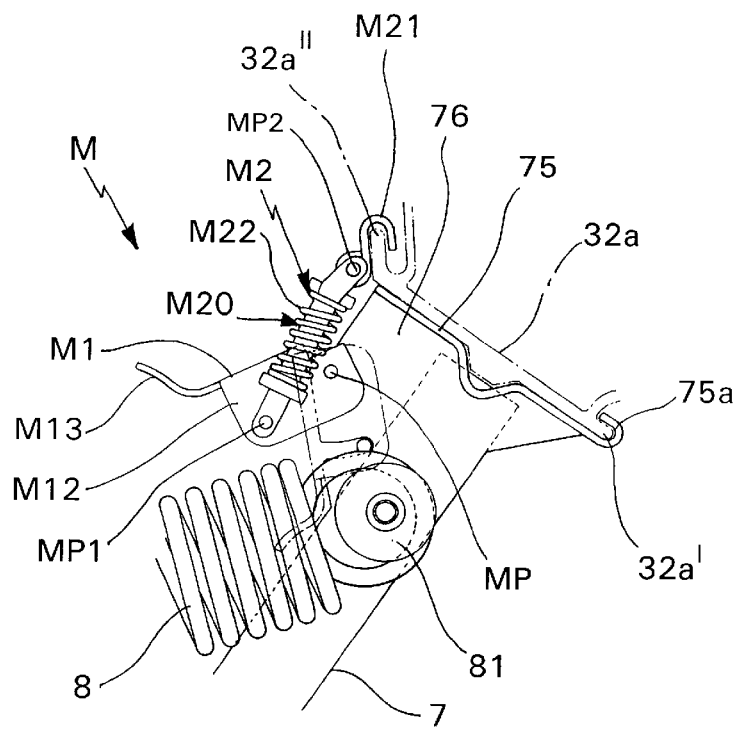
FIG. 13 is an explanatory drawing in a side view of the mounting portion.
Figure 14:
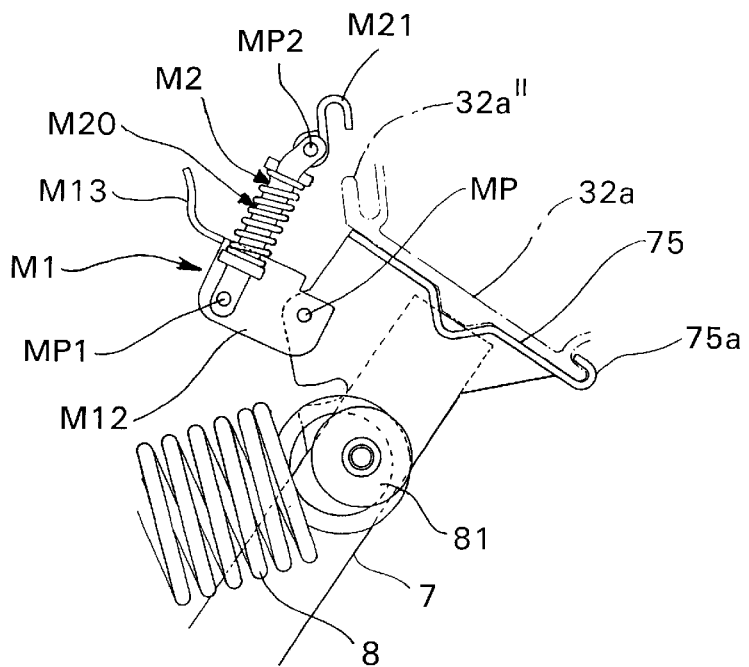
FIG. 14 is an explanatory drawing in a side view of the mounting portion.

As shown in FIGS. 11, 13 and 14, the second embodiment employs a detachable structure such that a short rail member 75 is provided at the end of the body arm 7 of the stand part 4 and a sliding member 32a having a slidable plane portion corresponding to the rail member 75 is formed on the exterior case 32 of the main device body 3.

A side edge portion of the rail member 75 at the one side thereof is folded inside to form an engagement edge 75a. Further, the side edge portion of the rail member 75 can slide in such a state that the engagement edge 75a is engaged with a side edge portion 32a' of the sliding member 32a. On the other hand, the other side edge portion of the sliding member 32a is bent and extends upwardly at an angle to form a locking edge portion 32a" that in turn can be locked and unlocked through a locking member M by a one-touch operation in a manner as will be described hereinafter.

Figure 12:
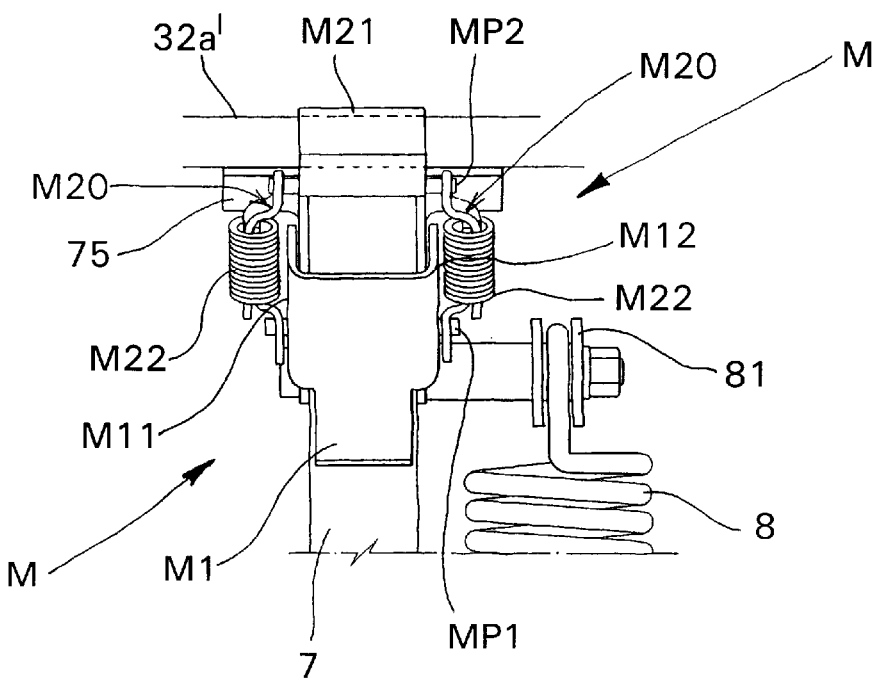
FIG. 12 is an explanatory drawing showing a mounting portion of the main device body of the cover device.

More specifically, as shown in FIG. 12 through FIG. 14, a mounting plate 76 for mounting the locking member is provided at an approximately upper end portion of the body arm 7 and the locking member M is mounted on the mounting plate 76.

The locking member M consists of a rotationally moving lever M1 in an approximately channel shape, which is pivotally supported on the mounting plate 76, and a locking portion M2 which is connected to the rotationally moving lever M1. The right and left side faces M11 and M12 of the rotationally moving lever M1 are pivotally connected in the vicinities of one ends thereof via a pivotally supporting pin MP. Further, right and left bars M20 for forming the locking portion are pivotally connected in the vicinity of the opposite ends of the pivotally supporting pin MP. Reference symbol MP1 represents a pivotally supporting pin for the bar M20.

A locking piece M21 is secured to each of the ends of the right and left bars 20 for forming the locking portion. The locking piece M21 is further engaged with the locking edge portion 32a" via the pivotally supporting pin MP2. In the drawings, reference numeral M13 represents an operating piece associatively provided on the rotationally moving lever M1 and reference numeral M22 represents a tensile coil spring mounted on the bar M20.

This structure of the body cover device permits the easy mounting of the main device body 3 on the body arm 7 of the stand part 4 by a one-touch operation simply by engaging (he locking piece M21 with the locking edge portion 32a" of the main device body 3 after mounting the main device body 3 on the body arm 7 and pushing down the rotationally moving lever M1 of the locking member M.

On the other hand, when the main device body 3 is to be detached, the above-described procedures are carried out in the opposite order. More specifically, the rotationally moving lever M1 of the locking member M is pressed upward and the locking piece M21 is then separated from the locking edge portion 32a" of the main device body 3 (FIG. 14), followed by sliding the main device body 3 and detaching the main device body 3 from the body arm 7.

Further, in this embodiment, engagement means K is provided between the bar 44 of the stand part 4 and the inside cylinder 43 for engaging the bar 44 with the inside cylinder 43 at the position when the bar 44 is pushed down.

Figure 15:
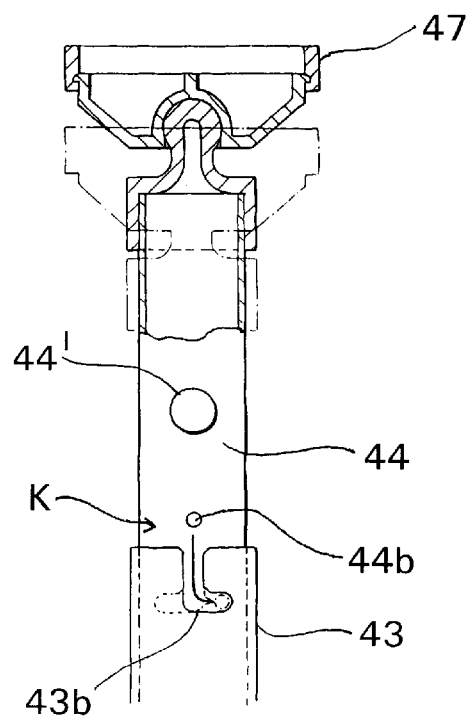
FIG. 15 is an explanatory drawing showing an elastic supporting portion of a stand part of the cover device.

As shown in FIG. 11 and FIG. 15, a lever 44' is mounted on the upper side of the bar 44 of the stand part 4 and a spring pin 44b is provided on the lower side of the lever 44' in the form of passing through the bar 44 and protruding at both ends. On the other hand, a L-shaped engagement channel 43b is formed in the inside cylinder 43 for engaging the end of the spring pin 44b. In this embodiment, the engagement means K is formed by the spring pin 44b and the engagement channel 43b.

Further, in this embodiment, a contact member 47 provided at the upper end of the bar 44 is formed to be rotationally movable in free directions.

More specifically, a ball shaft 44c is provided at the upper end of the bar 44 and a recessed portion corresponding to the ball shaft 44c is formed in the lower face of the contact member 47 to engage the both elements with each other so as to allow the rotational or pivotal movement of the contact member 47.

Upon installing the stand part 4 in the trunk room 10, the cover device A in this structure may become more likely to handle if the lever 44' is gripped to contract the bar 44 and the bar 44 is kept in a contracted state by the engagement means K. By keeping the bar 44 in a contracted state, an space above the stand part 4 may become free from contact with the ceiling wall 14 of the trunk room 10 to ensure an accurate position of the installation of the stand part 4. Then, if the engagement means K is released, the stand part 4 can be positively held in the accurate installation position. Therefore, the cover device A can be installed very easily, offering greatly improved operability.

As shown in FIG. 11, this embodiment differs from the first embodiment in the various points including, for example, the length of the shock absorbing material 41a pasted to the reverse of the leg seat 41, the structure of the tightener or fastener 48 secured to the upper end of the outside cylinder 42, and the configurations of the bracket 80 for mounting the coil spring and the stopper 61 for restricting the spring-up position of the main device body 3. However, the structuring components of this embodiment may be changed or modified without departing from the scope and spirit of this invention.

Third Embodiment

The third embodiment of this invention is described with reference to FIG. 16 through FIG. 18. In this embodiment, the same structuring elements are provided with the same reference numerals as those of the first embodiment.

The body cover device according to this embodiment has a more simplified structure of the locking member M of the second embodiment, while maintaining its functions. Therefore, the structure of a locking member M' as used for the third embodiment can provide advantage in cost.

The structure of the locking member M' according to this embodiment is configured such that rotationally moving lever-structuring pieces M1' and M1', each rising up from the right and left base ends of an inversely V-shaped operating piece M3', are pivotally supported at their ends on the locking member-mounting plate 76, a pivotally supporting pin MP1' is axially mounted at an approximately central portion of the rotationally moving lever-structuring pieces M1' and M1', and a locking spring M21' is secured to the pivotally supporting pin MP1', the locking spring M21' being made from a spring steel, folded at its end to form a locking portion M21a and formed into an approximately arched shape as a whole.

In this embodiment, too, the main device body 3 can be easily installed on the body arm 7 of the stand part 4 by a one-touch operation simply by the engagement of the locking portion M21a with the locking edge 32a" on the side of the main device body 3. Further, the simpler structure of the body cover device in this embodiment can provide easy handling performance and advantage in cost.

Figure 16:
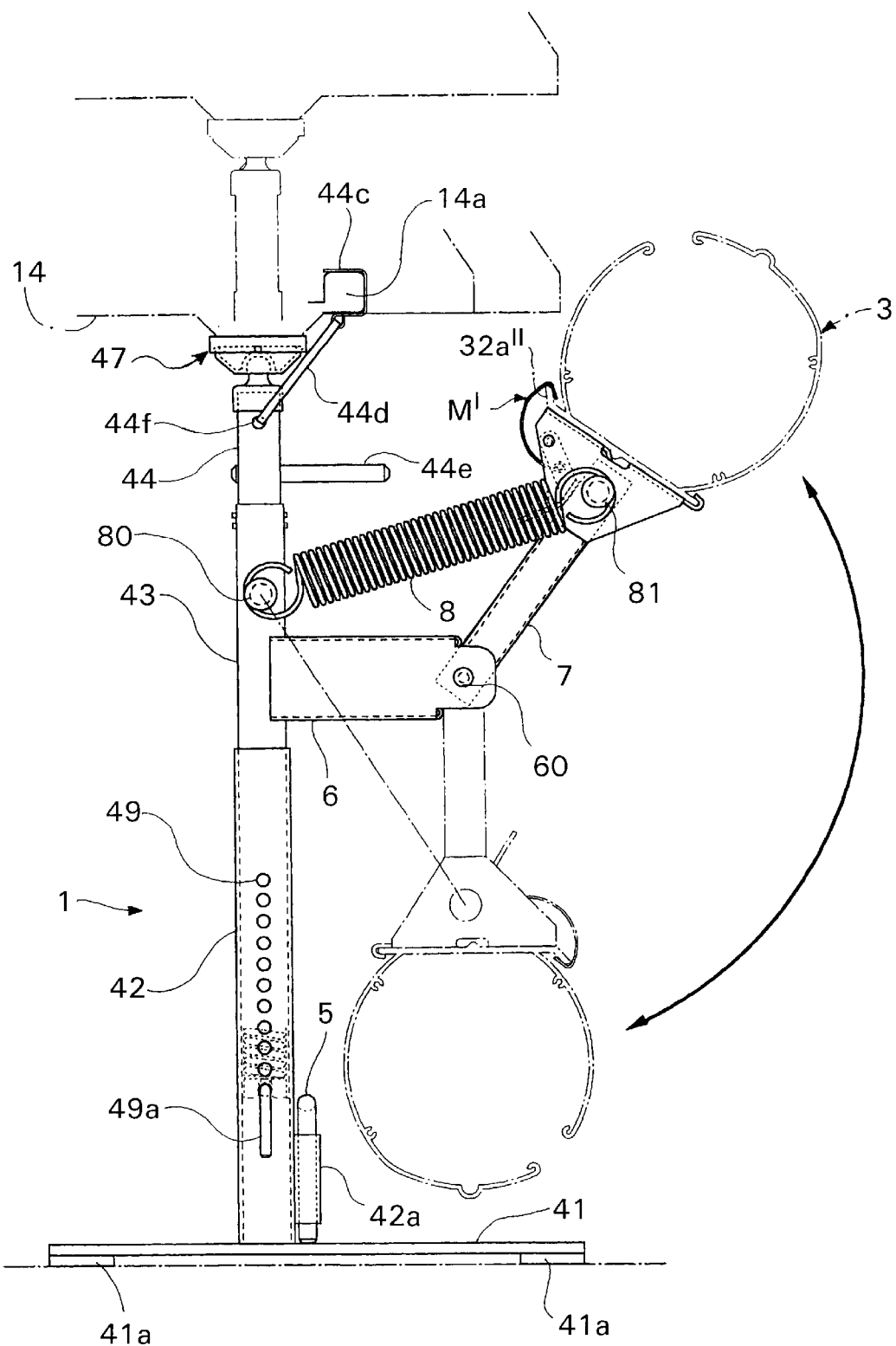
FIG. 16 is an explanatory drawing showing the cover device according to a third embodiment.

As shown in FIG. 16, the adjustment of the height of the stand part 4 is carried out by pinning between the outside cylinder 42 and the inside cylinder 43.

More specifically, the height of the stand part may be adjusted by inserting a number of stopper pins 49a into corresponding positioning through-holes 49 disposed at small intervals in the outside cylinder 42, while sliding the inside cylinder 43 in the outside cylinder 42 at the position at which the stand part 4 can be stayed in an appropriate state, so as to restrict the bottom position of the inside cylinder 43. The proper height of the stand part 4 in this case is such that the coil spring 45 stored in the inside cylinder 43 energizes or biases the bar 44 upward to the position high enough to allow the contact member 47 to be resiliently supported in the trunk room 10.

The bar 44 is provided with a handle 44e for easily pushing the bar 44 down against the coil spring 45.

The body cover device in this structure permits the easy setting of the stand part 4 into the trunk room 10 and can achieve easy handling and more improved operability.

Further, as shown in FIG. 16, the body cover device in this embodiment is provided with a safety fixture device that in turn consists of a piano wire 44c formed in a U-letter shape on the bar 44 and a stranded band 44d connected thereto. The stranded band 44d is passed through a stepped hole 44f provided near the end of the bar 44, and the piano wire 44c secured to the stranded band 44d is locked to a relatively rigid beam portion 14a formed on the ceiling wall 14 of the trunk room 10. This structure can prevent the cover device A from moving out, falling or shifting, when the car 1 suddenly brakes.

As described above, the body cover device in this embodiment can achieve easy handling and cost reduction.

Moreover, the body cover device in this embodiment can withstand load to an adequate extent, which may be imposed by the weight of the main device body 3 and the vibration of the car 1, because the supporting arm 6 for supporting the main device body 3 is set to be wider to improve the intensity of the device.

Fourth Embodiment

Figure 19:
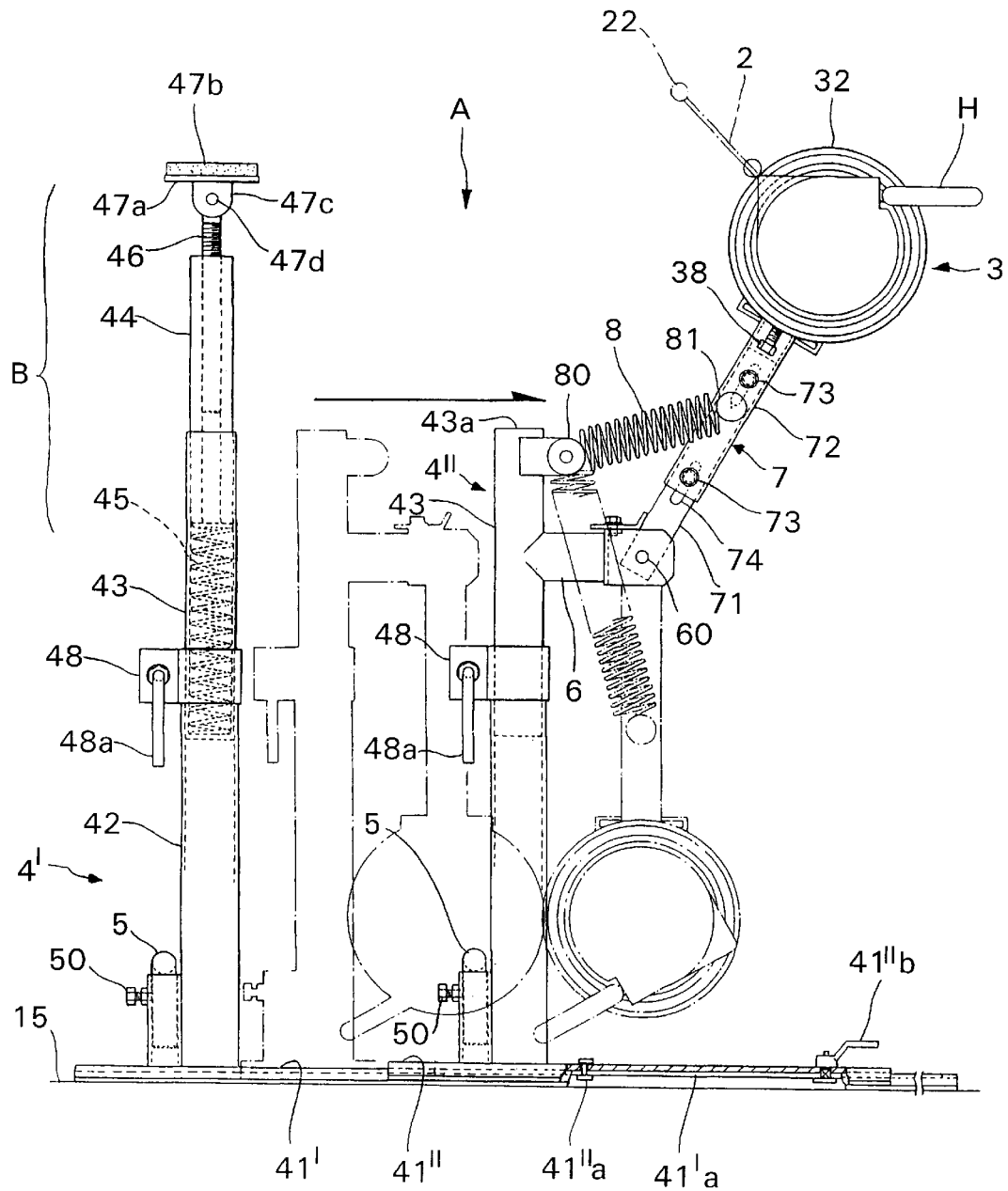
FIG. 19 is an explanatory drawing showing the cover device according to a fourth embodiment.

The fourth embodiment of this invention is described with reference to FIG. 19. The same structuring elements are provided with the same reference numerals as those of the first embodiment.

The body cover device according to the fourth embodiment differs from those of the first and second embodiments in that the stand part 4 in the previous embodiments is separated into a fixing stand part 4' and a main device body-supporting stand part 4". A rail-shaped leg seat 4" of the fixing stand part 4' is mounted on the bottom wall 15 of the trunk room 10 and a leg seat 41" of the main device body-supporting stand part 4" is secured onto the rail-shaped leg seat 4" so as to permit sliding the leg seat 41" of the main device body-supporting stand part 4" back and forth on the rail-shaped leg seat 41". In this case, the upper end face 43a of the inside cylinder 43 of the main device body-supporting stand part 4" remain closed. Reference numeral 41'a represents a sliding elongated slit provided in the leg seat 41' of the fixing stand part 4', reference numeral 41"a represents a guide provided on the leg seat 41" of the main device body-supporting stand part 4", and reference numeral 41"b represents a guide-combining fixture.

With the structure as described above, the body cover device A can fix the main device body-supporting stand part 4" at an appropriate position by sliding the stand part 4" to this side during the period of use even in the case where the cover device A has to be set in a position considerably farther from the gap E formed between the base edge 11a of the trunk lid 11 an the corner edge of the trunk room opening 10a, even if the depth of the trunk room 10 is significantly different in types and so. Therefore, the body cover device A can be used without any difficult even in such a case.

Fifth Embodiment

The fifth embodiment of this invention is described with reference to FIG. 20. The same structuring components in this embodiment are provided with the same reference numerals as those in the first through fourth embodiments.

In this embodiment, the supporting arm 6 and the body arm 7 for supporting the main device body 3 are arranged in the form of a linking mechanism. When the body cover is stored in the main device body 3 during the period of no use, this linking mechanism can locate the main device body 3 at a position at which the main device body 3 is transferred generally horizontally, yet a bit lower, and closer to the stand part 4 from the position during the period of use. In this embodiment, the main device body 3 is not stored in the trunk room 10 in a state in which it is suspended at the lowermost position.

Figure 20:
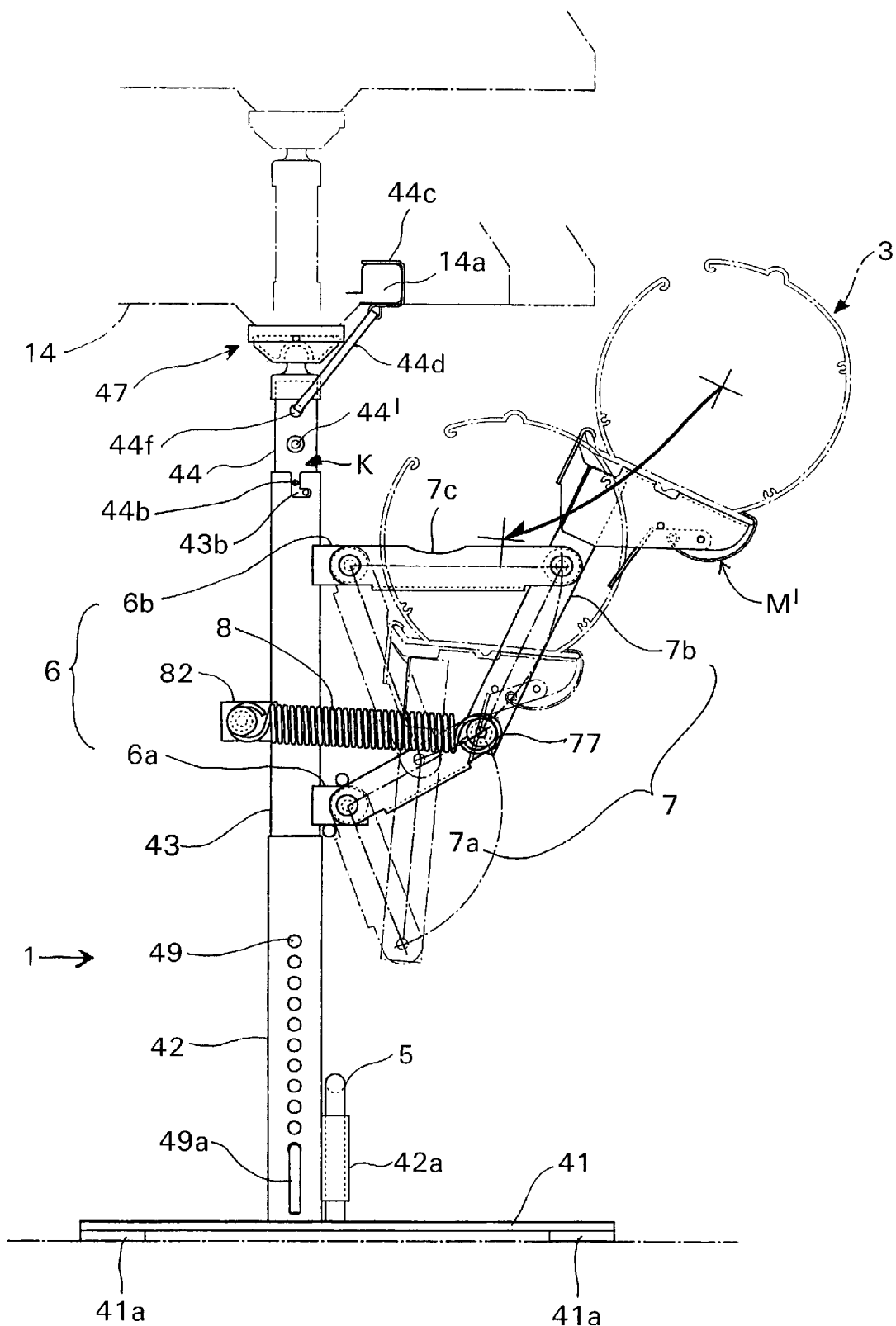
FIG. 20 is an explanatory drawing showing the cover device according to a fifth embodiment.

As shown in FIG. 20, the supporting arm 6 consists of a lower supporting short arm 6a and an upper supporting longer arm 6b protruding from the lower and upper portions of the inside cylinder 43 of the stand part 4, respectively. On the other hand, the body arm 7 consists of a lower body arm 7a and an upper body arm 7b, which are pivotally connected at the corresponding ends thereof. The base end of the lower body arm 7a is pivotally connected to the lower supporting short arm 6a and the end of the upper body arm 7b is pivotally connected to the upper supporting longer arm 6b via a connecting link arm 7c.

The inside cylinder 43 is provided with a spring-supporting bracket 82 at the side of the lower supporting arm 6a between the upper and lower supporting arms 6b and 6a, and a body-supporting coil spring 8 is provided to connect the spring-supporting bracket 82 to a pivotal supporting portion 77 located between the body lower arm 7a and the upper body arm 7b.

As indicated by a chain line in FIG. 20, the supporting arm 6 and the body arm 7 are bent or folded while working as the link mechanism, so that the main device body 3 can be stored during the period of no use after they moved closer to the stand part 4 almost horizontally yet somewhat downward from the position during the period of use.

Therefore, a lower space in the trunk room 10 can be used widely so that other loadings can be stored easily even in a state where the body cover device A is stored in the trunk room 10.

Figure 17:
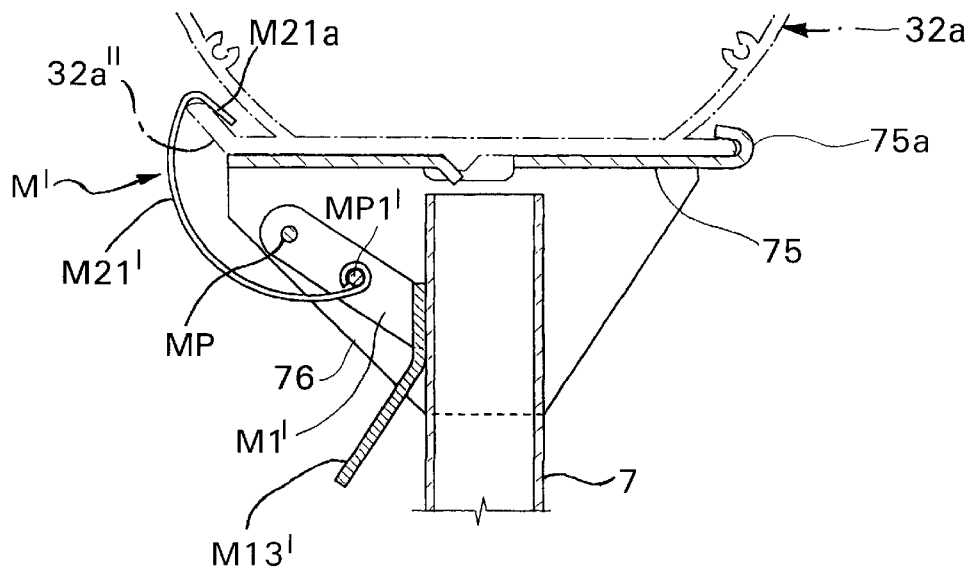
FIG. 17 is an explanatory drawing in a side view of the mounting portion of the main device body of the cover device.
Figure 18:
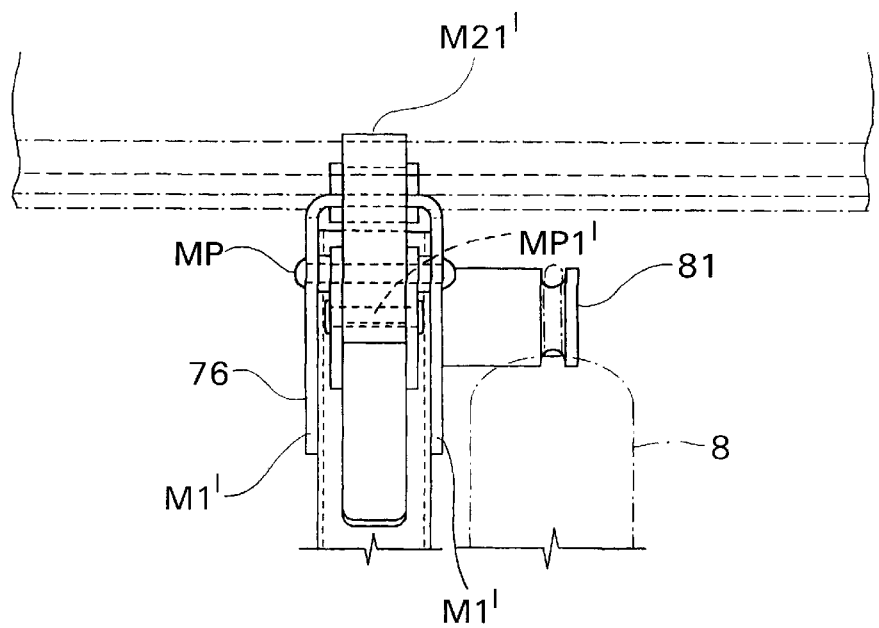
FIG. 18 is an explanatory drawing in a front view of the mounting portion.

Further, the cover device A in this embodiment permits the easy attachment and detachment of the main device body 3 by using a locking member M" similar to the locking member M' as used in the third embodiment (FIG. 16 and FIG. 17). In this embodiment, too, the mounting position of the locking member M" is located at the opposite side of that in the third embodiment, namely, at the side of the trunk room opening 10a, thus providing more flexibility in operation and improved operability.

Moreover, in this embodiment, the height of the stand part 4 can be adjusted in a manner similarly to the third embodiment by pinning between the outside cylinder 42 and the inside cylinder 43. Furthermore, a safety fixture is provided which consists of a piano wire 44c formed in U-shape on the bar 44 and a stranded band 44d connected thereto to prevent the cover device A from moving out, falling or shifting, for example, when the car 1 suddenly brakes.

Although this invention has been described by way of the embodiments as described above, however, it is to be noted herein that this invention is not interpreted in any respect as being limited to the above-described embodiments and that any modifications and changes are encompassed within the scope and spirit of the invention as long as they do not deviate therefrom.

For example, the stand part 4 can be resiliently supported in the trunk room 10 not only in the vertical but also crosswise or widthwise. Further, the driving means for rotating the drum 30 to the direction of delivery of the body cover can be in an electrical structure using a motor or others, rather than in a mechanical structure.

INDUSTRIAL UTILIZATION

The invention is embodied in the above-described configuration and provides following advantages.

The body cover device for car according to this invention is configured in such a manner that the main device body with the body cover stored therein can be delivered to cover the car body with the body cover and stored when the body cover is not used and that the stand part is disposed in the trunk room so as to firmly support the main device body. By supporting the main device body by the aid of the stand part between the inner walls of the trunk room, the body cover device can be installed with ease and without causing any damage on the trunk room. The body cover device according to this invention does not require any modifications of the trunk room in which the body cover device is to be installed. Therefore, the body cover device can offer the advantage that it can be used with extreme convenience. Moreover, the body cover device can provide easy and improved handling performance upon delivering the body cover to the car body as well as upon winding up the body cover in the main device body.

As the stand part can be firmly supported vertically between the inner upper and lower walls of the trunk room, the stand part can also firmly support the main device body without falling down or deviating from the fixed position upon rapidly braking the car.

The stand part of the body cover device according to this invention is provided with the elastically supporting member so that the elastically supporting member serves as pressing the stand part against the inner walls of the trunk room. Therefore, the elastically supporting member of the stand part can firmly support the main device body and ensure highly stable installation of the body cover device without falling out from the fixed position or deviating therefrom. Further, the stand part is configured so as to cause any damages on the inner walls of the trunk room.

On the other hand, the main device body of the body cover device according to this invention may be oscillatably connected to the stand part via the supporting arm that in turn is supported by a supporting member such as a spring. When the main device body is supported at the spring-up position when the car body is covered with the body cover, the device is located closer to a worker, resulting in easy handling performance and operability.

For example, the main device body of the body cover device may be arranged so as to be pivotally movable upwardly and downwardly, the body cover device does not interfere with storage of other belongings in the trunk room. The main device body is automatically raised to the upper position when the body cover is being delivered and developed over the car body and fallen down to the lower position due to the self-weight of the heavy body cover when it is released and wound up for storage in the main device body. Therefore, the body cover device according to this invention presents the advantage that it is very easy to handling and it has a simplified structure. When the body cover is stored in a suspended state without imposing heavy load on the main device body and the stand part even during running on a bad road, the body cover device according to this invention has improved durability.

Moreover, the main device body can also be folded and stored at the resting position close to the position at which the main device body is raised during the period of use, without pivotally suspending the heavy main device body from the raised position to the resting position at which the main device body is hanging down during the period of non-use. This folded configuration of the main device body does not require a larger radius when pivotally moving the main device body upon raising and lowering the main device body so that this can save a space in the trunk room. Therefore, this folded configuration of the body cover device allows efficient use of a wider space in the trunk room.

The main device body of the body cover device according to the invention is disposed so as for the delivery-and-windup port to correspond to or to be located close to the gap formed between the edge of the body roof and the edge of the trunk lid, through which the body cover can be delivered and developed over the body roof and wound up when the body cover is to be stored in the main device body during the period of no use. Therefore, the body cover can be pulled from the main device body and wound up through the gap without interference with the other parts of the body roof and the trunk lid so that the body cover can be developed with ease and it is very easy to handle.

The main device body of the body cover device according to the invention is composed of the drum with the body cover wound thereon and the driving means for rotating the drum so as to deliver the body cover, so that the body cover device can deliver the body cover in a semi-automatic way. Therefore, the work of developing the body cover can be done with extreme ease.

As the driving means is configured such that the delivery shaft with the spring mounted thereon is connected to the drum through the spring. Further, the driving means is provided with the energy accumulating means for resiliently acting the spring with the rotation of the delivery shaft in the opposite direction of delivery of the body cover. Therefore, the delivery shaft can be rotated with the resilience of the spring following the operation of the energy accumulating means to allow easy delivery of the body cover with simple mechanical operation.

As the winder for winding the delivered body cover may be provided on the drum on which the body cover is wound, the body cover may be automatically wound up on the drum and stored in the main device body disposed in the trunk room. The disposition of the winder can achieve easy work for covering the car body with the body cover and storage of the body cover in the main device body. Further, this can save much labor that is otherwise required.

Further, as the body cover is considerably heavy so that the main device body also becomes heavy, large load is imposed on the main device body even when the body cover is stored in a downward suspended state in the trunk room. Therefore, the body cover device according to the invention can stably maintain an overhang state and withstand the relatively heavy main device body.

Moreover, the body cover may be provided with a pair of core members, each made of a core material, extending in parallel to the direction of delivery and winding-up in order to prevent the deformation of the body cover during delivery and winding-up. Therefore, this structure of the body cover allows smooth delivery and winding-up of the body cover.

As the main device body may be detachably mounted on the stand part so that the main device body can be removed and stored during the period of no use and easily mounted during the period of use. This mode of the main device body can provide more convenience in operation and easy handling performance.

The stand part comprises the outside cylinder disposed upright on the leg seat, the bottomed inside cylinder slidably arranged in the outside cylinder and oscillatably mounted with the main device body, the bar slidably arranged in the inside cylinder and provided with the contact member at the end, and the spring laid between the bottom of the bar and the bottom of the inside cylinder, so that the stand part can be stored and fixed to the trunk lid in a simple structure.

As the engagement means is provided between the bar and the inside cylinder, the stand part can be firmly locked to the inside cylinder at the position of pushing down the bar so that the cover device can be easily fixed to the trunk lid.

As described above, the body cover device according to this invention can provide the high quality body cover device and offer applicability to various types of cars and high flexibility in operation.

The body cover device is easily stored and fixed in the car body, particularly, in the trunk room without being modified so that the body cover can be semi-automatically delivered and almost fully automatically wound up and stored in the main device body. Therefore, the body cover device according to the invention can provide easier handling performance and operability. At the same time, it can achieve extremely easy work for covering the car body with the body cover and storing the body cover in the main device body, thereby saving much labor. In particular, the work for delivery and winding-up of the body cover otherwise requires much labor.

What is claimed is:

1. A body cover device for car comprising:
a body cover for covering a car body;
a main device body for delivering and storing said body cover, from which said body cover is pulled when use and in which said body cover is stored when non-use; and
a stand part for supporting said main device body in the trunk room, disposed separately from said main device body in the trunk room and firmly pressed against two interior walls of the trunk room;
wherein said main device body is connected to said stand part through supporting means so as to be movable between a first position at which said body cover is in use and a second position at which said body cover is in non-use and stored in said main device body; and
wherein said stand part supports said main device body so as to enable delivery of said body cover from said main device body and storage of said body cover in said main device body.

2. A body cover device for car comprising:
a body cover for covering a car body;
a main device body for delivering and storing said body cover, from which said body cover is pulled when use and in which said body cover is stored when non-use; and
a stand part for supporting said main device body in the trunk room, disposed vertically in the trunk room and firmly pressed against two interior walls of the trunk room;
wherein said main device body is connected to said stand part through supporting means so as to be movable between a first position at which said body cover is in use and a second position at which said body cover is in non-use and stored in said main device body; and
wherein said stand part supports said main device body so as to enable delivery of said body cover from said main device body and storage of said body cover in said main device body.

3. The body cover device as claimed in claim 1 or 2, wherein said stand part comprises an elastically supporting member that elastically extends to firmly press said stand part against one of the two interior walls of the trunk room and support said stand part in the trunk room.

4. The body cover device as claimed in claim 3, wherein said elastically supporting member elastically extends until an end of said elastically supporting member contacts with one of the interior walls of the trunk room and firmly presses said stand part against the one of the two interior walls thereof to support said stand part in the trunk room.

5. The body cover device as claimed in claim 3, wherein said elastically supporting member extends upwardly until a top of said elastically supporting member contacts with a rear face of the upper interior wall of the trunk room to firmly press said stand part against the two interior walls of the trunk room.

6. The body cover device as claimed in claim 2, wherein said stand part is disposed vertically between an inner wall portion of a ceiling wall and an inner wall portion of a bottom wall of the trunk room.

7. The body cover device as claimed in claim 1 or 2, wherein said main device body is connected to said stand part through the supporting means so as to be movable between the first position and the second position; and
said main device body takes the first position when said body cover is in use and said main device body takes the second position when said body cover is in non-use.

8. The body cover device as claimed in claim 7, wherein said main device body is connected to said stand part through the supporting means so as to be movable vertically or diagonally between the first position and the second position.

9. The body cover device as claimed in claim 8, wherein said main device body is raised upward from the second position to the first position when said body cover is being delivered and developed over the car body; and said main device body is lowered from the first position to the second position at which said device body is stored in a downward suspended state in said main device body when said device body is released from covering the car body.

10. The body cover device as claimed in claim 8, wherein:

said main device body is pulled diagonally upward to the first position from the second position when said body cover is being delivered and developed over the car body and pulled diagonally downward from the first position to the second position closer to said stand part when said body cover is stored in said main device body;

said main device body in the first position is located farther from said stand than said main device body in the second position; and each of said main device body in the first position and said main device body is in the second position is directed to the rear face of the upper interior wall of the trunk room.

11. The body cover device as claimed in claim 1 or 2, wherein said main device body is installed on said stand part in such a manner that a delivery-and-windup port of said main device body is disposed to face a gap formed between a base edge of a trunk Id and an edge of a trunk room opening and to enable delivery of said body cover therethrough.

12. The body cover device as claimed in claim 1 or 2, wherein said main device body comprises a drum with said body cover wound up thereon and driving means for rotating the drum in a direction of delivery of said body cover.

13. The body cover device as claimed in claim 12, wherein the drum is provided with a winder for winding up said body cover delivered.

14. The body cover device as claimed in claim 1 or 2, wherein the supporting means comprises a body arm connected resiliently to said main device body and a supporting arm connected to said stand part and supported on said stand part.

15. The body cover device as claimed in claim 14, wherein the body arm is connected to said stand part by the aid of a spring so as to resiliently move said main device body between the first position and the second position.

16. The body cover device as claimed in claim 12, wherein:

said driving means comprises a delivery shaft with a spring mounted thereon and energy accumulating means for bending the spring by rotating said delivery shaft in a direction opposite to the direction of delivery of said body cover;

said delivery shaft is connected through a one-way clutch to the drum for winding up said body cover; and said body cover is delivered and developed over the car body by rotating said delivery shaft by the resilience of the spring created by operation of the energy accumulating means.

17. The body cover device as claimed in claim 1 or 2, wherein said main device body is detachably mounted on the supporting means.

18. The body cover device as claimed in claim 1 or 2, wherein said stand part comprises a pair of columns for supporting said main device body and each is provided with an elastically supporting member.

19. The body cover device as claimed in claim 18, wherein said elastically supporting member elastically extends until an end of said elastically supporting member contacts with one of the interior walls of the trunk room and firmly presses said stand part against the one of the two interior walls thereof to support said stand part in the trunk room.

20. The body cover device as claimed in claim 18, wherein said elastically supporting member extends upwardly until a top of said elastically supporting member contacts with a rear face of the upper interior wall of the trunk room to firmly press said stand part against the two interior walls of the trunk room.

21. The body cover device as claimed in claim 18, wherein:

said column is provided with an outside cylinder disposed upright on a leg seat; a bottomed inside cylinder slidably mounted in the outside cylinder and mounted with said main device body so as to movable upwardly and downwardly; a bar slidably mounted in the inside cylinder and provided with a contact member at the end so as to firmly contact with a one interior wall of the trunk room; and a spring interposed between the bottom of the bar and the bottom of the inside cylinder.

22. The body cover device as claimed in claim 18, wherein:

said column is provided with an outside cylinder disposed upright on a one interior wall of the trunk room; a bottomed inside cylinder slidably mounted in the outside cylinder and mounted with said main device body so as to movable upwardly and downwardly; a bar slidably mounted in the inside cylinder and provided with a contact member at the end so as to firmly contact with the other interior wall of the trunk room; and a spring interposed between the bottom of the bar and the bottom of the inside cylinder; and said elastically supporting means comprises the bar slidably mounted in the inside cylinder; the spring interposed between the bottom of the bar and the bottom of the inside cylinder; a threaded bar threadedly secured to the bar for adjusting a projection length of the contact member; and the contact member mounted on the bar so as to firmly contact with one of the interior walls of the trunk room.

23. The body cover device as claimed in claim 19, wherein engagement means is provided between the bar and the inside cylinder so as to be locked to the inside cylinder at a position at which the bar is pushed down.

24. The body cover device as claimed in claim 1 or 2, wherein said stand part is disposed so as to be movable in the trunk room between a position at which said body cover is in use and a position at which said body cover is in non-use.

25. The body cover device as claimed in claim 14, wherein:

the body arm comprises an upper body arm and a lower body arm;

the supporting arm comprises an upper supporting arm and a lower supporting arm, mounted on said stand part at an interval;

the upper body arm is connected to said main device body at a top end thereof and to a top of the lower body arm at a base end thereof and supported on the upper supporting arm;

the lower body arm is connected to the lower supporting arm at a base end thereof;

a link arm is connected at one end thereof to the upper supporting arm and at the other end thereof to the upper body arm to support the upper body arm;

a spring means is mounted at a one end thereof on said stand part and mounted at the other end thereof on a connection between the upper body arm and the lower body arm;

the spring means is biased to raise the body arm upward as said main device body is pulled diagonally upward and farther from said stand part to the first position from the second position by said body cover in use and the spring is resiliently back diagonally downward and closer to said stand part to the second position from the first position when said body cover in non-use is stored in said main device body; and said main device body in the first position takes a posture in which said main device body is held upward on top of the upper body arm in a position farther from said stand part and said main device body takes a posture in which said main device body is held upward on top thereof in a position closer to said stand part.

26. The body cover device as claimed in claim 1 or 2, wherein:

said stand part comprises a supporting stand part and a fixing stand part;

the supporting stand part is disposed to support said main device body;

the fixing stand part is firmly fixed between a ceiling wall and a bottom wall of the trunk room;

a leg seat for the fixing stand part is formed in a rail structure and mounted on the bottom wall of the trunk room;

a leg seat for the supporting stand part is mounted on the leg seat for the fixing stand part so as to be slidable transversely;

the supporting stand part with said main device body supported thereon is slidably moved on the leg seat for the fixing stand part to a position in which said body cover is to be delivered; and the supporting stand part is slidably moved on the leg seat for the fixing stand part back to a position in which said main device body is stored in the trunk room.

27. The body cover device as claimed in claim 17, wherein:

the supporting means comprises a body arm connected resiliently to said main device body and a supporting arm connected to said stand part and supported on said stand part;

a short rail member is mounted on top of the body arm; and a sliding member is provided on said main device body so as to be detachably engageable with the short rail member mounted on top of the body arm.

28. The body cover device as claimed in claim 27, wherein said main device body is detachably fixed to the short rail member of the body arm by the aid of a locking member.

* * * * *